(12) United States Patent
Taniguchi et al.

(10) Patent No.: US 7,407,694 B2
(45) Date of Patent: *Aug. 5, 2008

(54) BLOCK COPOLYMER

(75) Inventors: Akio Taniguchi, Osaka (JP); Kentaro Takesada, Osaka (JP); Yutaka Kaneda, Osaka (JP); Tadashi Kokubo, Osaka (JP); Nobuaki Ohshiro, Osaka (JP); Atsushi Kumasaki, Osaka (JP); Takeshi Chiba, Hyogo (JP); Tomoki Hiiro, Hyogo (JP)

(73) Assignee: Kaneka Corporation, Osaka (JP)

( * ) Notice: Subject to any disclaimer, the term of this patent is extended or adjusted under 35 U.S.C. 154(b) by 362 days.

This patent is subject to a terminal disclaimer.

(21) Appl. No.: 11/203,608

(22) Filed: Aug. 11, 2005

(65) Prior Publication Data

US 2005/0272865 A1 Dec. 8, 2005

Related U.S. Application Data

(63) Continuation of application No. 10/503,024, filed as application No. PCT/JP03/01414 on Feb. 12, 2003.

(30) Foreign Application Priority Data

| Feb. 13, 2002 | (JP) | ............................... 2002-35791 |
| Feb. 14, 2002 | (JP) | ............................... 2002-37148 |
| Mar. 15, 2002 | (JP) | ............................... 2002-72551 |
| Mar. 15, 2002 | (JP) | ............................... 2002-72723 |
| Mar. 28, 2002 | (JP) | ............................... 2002-92579 |

(51) Int. Cl.
*C08L 53/00* (2006.01)

(52) U.S. Cl. ..................... 428/35.7; 428/36.8; 428/36.9; 525/88; 525/92 B; 525/92 E; 525/92 F; 525/92 L

(58) Field of Classification Search ................... 525/88, 525/92 B, 92 E, 92 F, 92 L; 428/35.7, 36.8, 428/36.9
See application file for complete search history.

(56) References Cited

U.S. PATENT DOCUMENTS

| 5,499,947 | A | * | 3/1996 | Tauber | ......................... 454/69 |
| 5,756,585 | A | * | 5/1998 | Teyssie et al. | ................ 525/299 |
| 6,458,893 | B1 | * | 10/2002 | Tasaka et al. | ................ 525/222 |
| 7,211,625 | B2 | * | 5/2007 | Tsuji et al. | ..................... 525/93 |
| 2004/0147674 | A1 | | 7/2004 | Kakeda et al. | |

FOREIGN PATENT DOCUMENTS

| JP | 6-93030 A | 4/1994 |
| JP | 10-8013 A | 1/1998 |
| JP | 10-298248 A | 11/1998 |
| JP | 2001-200026 A | 7/2001 |
| WO | WO 02/092696 A1 | 11/2002 |

OTHER PUBLICATIONS

Grassie, N. et al., "Thermal Degradation of Copolymers of Methyl Methacrylate and Butyl Acrylate," *Makromolekulare Chemie*, vol. 169, 1973, pp. 117-127, abstract only.
Grassie, N. et al., "Relations Between Thermal, Photothermal, and Photolytic Degradation Processes in Methacrylate/Acrylate Copolymers," *Chemicke Zvesti*, vol. 26(3), 1972, pp. 208-216, abstract only.
Denq, Bar-Long et al., "Study of the Thermal Degradation Behavior of PMMA Blended With Poly(Dipropoxyphosphazene)," *Guoli Taiwan Daxue Gongcheng Xuekan*, vol. 70, 1997, pp. 41-50, abstract only.
International Search Report from Corresponding International Application No. PCT/JP03/01414, dated Apr. 30, 2003, 4 pages.
International Preliminary Examination Report from Corresponding International Application No. PCT/JP2003/001414, dated Mar. 3, 2004, 4 pages.

* cited by examiner

*Primary Examiner*—Jeffrey C Mullis
(74) *Attorney, Agent, or Firm*—Brinks Hofer Gilson & Lione

(57) ABSTRACT

The present invention relates to a block copolymer (A) including a (meth)acrylic polymer block (a) and an acrylic polymer block (b). The (meth)acrylic polymer block (a) is preferably copolymerized with a monomer having a functional group having high cohesive force, such as a carboxyl group, so that the 5%-weight-loss temperature is 300° C. or more or the tensile strength is 3 MPa or more, and the hardness measured by a type A durometer according to JIS K6253 is 50 or less, and a compression set measured after 22 hours at 70° C. is 45% or less. The block copolymer (A) exhibits excellent thermal decomposition resistance and low compression set at high temperatures. The block copolymer (A) can be used as a soft material for automobile, and has low hardness, high adhesion, high oil resistance, high weather resistance, high heat resistance, high recycling property, high tensile properties, and high wax remover resistance.

21 Claims, No Drawings

BLOCK COPOLYMER

RELATED APPLICATIONS

This application is a continuation of application Ser. No. 10/503,024, filed Jul. 29, 2004, which application is a national stage of PCT application PCT/JP03/01414 filed on Feb. 12, 2003, claiming priority of Japanese Application No. 2002-35791 filed on Feb. 13, 2002; Japanese Application No. 2002-37148 filed on Feb. 14, 2002; Japanese Application No. 2002-72723 filed on Mar. 15, 2002; and Japanese Application No. 2002-92579 filed on Mar. 28, 2002.

BACKGROUND

1. Technical Field

The present invention relates to a block copolymer having excellent thermal decomposition resistance and oil resistance, exhibiting good compression set even at high temperatures, and being usable as a rubber, a thermoplastic resin, an impact modifier for thermoplastic resins, a compounding agent for a compound material having elasticity between those of resins and rubber, a paint, a binding agent, or an adhesive. More specifically, the present invention relates to a block copolymer containing a methacrylic polymer and an acrylic polymer and having excellent balance between physical properties, particularly thermal decomposition resistance and oil resistance, and good compression set at high temperatures.

The present invention further relates to a soft material for automobile containing a thermoplastic elastomer composition having low hardness, excellent adhesion, excellent heat resistance, excellent oil resistance, and excellent tensile properties (mechanical properties), and also having excellent flexibility, formability.

2. Background Art

In general, a thermoplastic elastomer has an alloy structure comprising a rubber component (soft segment) exhibiting entropy elasticity, and a restrictive component (hard segment) which is fluid at high temperatures and which prevents plastic deformation at room temperature and gives a reinforcement effect to the rubber component. For example, in a styrene elastomer, styrene blocks aggregate to function as a hard segment, whereas butadiene blocks or isoprene blocks form a matrix to function as a soft segment. An olefin elastomer has an alloy structure in which rubber such as EPDM is dispersed in a resin such as PP. In any of the elastomers, the hard segment is fluid at high temperatures, and thus permits thermoplastic processing such as injection molding. In addition to the styrene elastomer and the olefin elastomer, examples of thermoplastic elastomers include vinyl chloride elastomers, ester elastomers, amide elastomers, and urethane elastomers.

However, conventional styrene or olefin thermoplastic elastomer is insufficient in rubber elasticity, particularly compression set at high temperatures, as compared with crosslinked rubber. Therefore, thermoplastic elastomer exhibiting high rubber elasticity even at high temperatures is desired.

On the other hand, it is known that a (meth)acrylic block copolymer including a hard segment of methyl methacrylate or the like and a soft segment of butyl acrylate or the like is usable as a thermoplastic elastomer. As a block copolymer having a (meth)acrylic polymer block and an acrylic polymer block, the specification of Japanese Patent No. 2553134 discloses known examples such as a block copolymer (MMA-b-BA-b-MMA) of poly(methyl methacrylate)-b-poly(butyl acrylate)-b-poly(methyl methacrylate), and a block copolymer (MMA-b-2EHA-b-MMA) of poly(methyl methacrylate)-b-poly(2-ethylhexyl acrylate)-b-poly(methyl methacrylate). (Meth)acrylic block copolymers are characterized by excellent weather resistance, durability, heat resistance and oil resistance.

Acrylic block copolymers can be synthesized by various types of living polymerization. Examples of living polymerization include so-called group transfer polymerization in a silylketene acetal/Lewis acid system (Japanese Unexamined Patent Application Publication No. 62-292806), living polymerization using porphyrin-organoaluminum complex (S. Inoue and others, Macromolecules, Vol. 24, p. 824, 1991), and living polymerization using an organic rare earth metal complex as an initiator (Japanese Unexamined Patent Application Publication No. 6-93060). In particular, for polymerization using an organic rare earth metal complex, it has been reported that a (meth)acrylic polymer block is stereoregularly polymerized, and an acrylic polymer block is non-stereoregularly polymerized to form a block copolymer having excellent heat resistance and impact resistance or excellent elastomeric properties. Furthermore, in a method of atom transfer radical polymerization using a halogen-based initiator and a copper catalyst, an acrylic ester is polymerized, and then ester bonds are selectively decomposed to obtain a block polymer composed of polyacrylic acid-polyacrylic ester-polyacrylic acid (Japanese Unexamined Patent Application Publication No. 2001-234147). It is also introduced that the resultant block polymer can be used as an adhesive exhibiting a small change in physical properties even at high temperatures.

However, the hard segments of these (meth)acrylic block copolymers have glass transition temperatures of 150° C. or less, and thus have difficulty in exhibiting rubber characteristics at high temperatures which are required in the automobile field. Also, acrylic block polymers having hard segments of acrylic acid exhibit a breaking strength of less than 3 MPa (NITTO DENKO Technical Report (Nitto-Giho), Vol. 38, No. 2, November, 2000), and thus have the problem of failing to exhibit sufficient strength for use as elastomeric materials.

Furthermore, as an invention relating to the design of an adhesive material achieving a small change in physical properties even at high temperatures and having excellent balance between adhesive properties such as retention, an adhesive comprising a (meth)acrylic block copolymer having a hard segment of a polymethacrylic acid block has been reported (Japanese Unexamined Patent Application Publication No. 10-298248). Although this invention introduces a di-block polymer composed of polymethacrylic acid and polyacrylic ester in examples, di-block structures generally cannot express substantial compression set and breaking strength, which are important properties of elastomer, and thus the development of thermoplastic elastomer having excellent heat resistance is desired.

On the other hand, it is known that block copolymers can be used as compositions with thermoplastic resins. As such block copolymers, styrene-butadiene copolymers, styrene-isoprene copolymers, and hydrogenated polymers of these copolymers (called "styrene-ethylene-butylene copolymers", and "styrene-ethylene-propylene copolymers", respectively) are widely used. By using these block copolymers, compositions having excellent balance between impact resistance, rigidity, and forming fluidity can be obtained. However, the thermoplastic resins usable with the block copolymers are limited to low-polarity resins such as polystyrene resins, polyolefin resins, and polyphenylene ether resins.

Also, it has recently been known that a block copolymer containing a methacrylic polymer and an acrylic polymer functions as an excellent impact resistance modifier, and a combination with a thermoplastic resin produces a thermoplastic resin composition having excellent impact resistance. In this case, a high-polarity resin such as a polyvinyl chloride resin, a polymethyl methacrylate resin, a polycarbonate resin, a polyester resin, or a polyamide resin is effective as the thermoplastic resin.

The hard segment of a thermoplastic elastomer is fluid at high temperatures, and thus permits thermoplastic processing such as injection molding. However, when the thermal decomposition temperature of the thermoplastic elastomer is lower than the injection molding temperature, the thermoplastic elastomer may cause thermal deterioration. For example, the above-described high-polarity resin such as a polyvinyl chloride resin, a polymethyl methacrylate resin, a polycarbonate resin, a polyester resin, or a polyamide resin has both a high molding temperature and high heat resistance, and thus such a resin cannot be used for molding a mixture with the thermoplastic elastomer because the thermoplastic elastomer is thermally decomposed. In particular, most of the methacrylic polymers are decomposed to monomers by depolymerization at 170° C. to 250° C. (Polymer Handbook Third Edition, Wiley-Interscience, 1989). Therefore, when high-temperature thermal stability is required, an ester elastomer or an amide elastomer must be selected. However, such an elastomer may also be required to have improved physical properties including oil resistance, controlled balance of physical properties, and reduction of cost, and the development of a novel elastomer is greatly demanded.

A soft polyurethane (RIM urethane) material and a poly (vinyl chloride)-based (soft PVC-based) material have recently been used for molded products required a good touch, such as automobile parts. However, these materials have the problem of resources saving and environmental protection, i.e., the problem of recycling. The RIM urethane material is thermally curable, and the soft PVC contains a large amount of plasticizer and produces chlorine gas by heating. Thus, it is impossible or difficult to recycle these materials. Therefore, a resin alternative to the soft vinyl chloride resin and the polyurethane resin is demanded. A candidate of such an alternative material is a thermoplastic elastomer resin which is a rubber-like material, not requires a crosslinking process, and exhibits formability comparable to that of thermoplastic resins, and this thermoplastic elastomer resin has recently attracted attention in the field of automobile parts, household appliance parts, and construction materials.

Although conventional olefin thermoplastic elastomer and styrene thermoplastic elastomer are excellent in recycling property and mechanical properties, these elastomers have the problem of low adhesion to resins and metals and low oil resistance. Although the olefin thermoplastic elastomer is known to have proper flexibility and processability, the olefin thermoplastic elastomer does not exhibit sufficient weather resistance and oil resistance and cannot be directly used as an alternative. In particular, many processes for removing rust-proof wax from an automobile often use a wax remover comprising a hot-water mixture containing kerosene and a surfactant. Thus, the use of the olefin thermoplastic elastomer as a material for exterior members has the problem of causing poor surface appearance during the removal of the wax.

Typical examples of hollow-molded products among the automobile parts include a boot and a hose. In particular, with respect to the boot, an accordion joint boot is mounted on a joint of an automobile or an industrial machine, for holding the sealed grease or preventing contamination with dust. Such a joint boot is conventionally made of rubber such as chloroprene, or a composition containing a monoolefin copolymer rubber and a polyolefin resin that are partially crosslinked with an organic peroxide used as a crosslinking assistant, as disclosed in Japanese Examined Patent Application Publication No. 53-21021.

From the viewpoint of recycling, thermoplastic polyester elastomers, which are non-crosslinking materials, have recently been used. Although the thermoplastic polyester elastomers are excellent in mechanical properties, heat resistance and oil resistance, the polyester elastomers have the problem of low flexibility due to high hardness, thereby significantly degrading mountability.

Therefore, in order to solve the problem, thermoplastic copolyester elastomer compositions comprising thermoplastic copolyester elastomers and rubber compositions are proposed in Japanese Unexamined Patent Application Publication Nos. 6-145477 and 7-97507. However, these thermoplastic copolyester compositions do not have flexibility and oil resistance sufficient for boots and hoses, and further investigation is required.

Also, Japanese Unexamined Patent Application Publication No. 2000-351889 discloses a thermoplastic elastomer composition comprising a thermoplastic copolyester elastomer and acrylic rubber. Although the oil resistance and boot-assembling performance are improved by mixing the acrylic rubber, molding fluidity decreases depending upon the content of the acrylic rubber. Therefore, molding is difficult, and the problem of flexibility remains unsolved, thereby causing the need for further improvement.

As described above, the thermoplastic polyester elastomer has excellent mechanical strength, but it has disadvantages of high hardness and poor oil resistance. Also, the acrylic rubber-compounded thermoplastic elastomer has improved oil resistance, but it still has disadvantages of poor formability and poor flexibility. Therefore, the application to automobile hollow-molded products is limited, and a material for automobile hollow-molded products having excellent oil resistance and excellent flexibility is required.

DETAILED DESCRIPTION OF THE INVENTION

Disclosure of the Invention

It is an object of the present invention to provide a thermoplastic elastomer (block copolymer) excellent in thermal decomposition resistance and heat resistance allowing the elastomer to exhibit good rubber elasticity even at high temperatures.

It is another object of the present invention to provide a thermoplastic elastomer composition for automobiles (soft material for automobile) composed of a block copolymer having excellent oil resistance, excellent heat resistance, and excellent flexibility, the thermoplastic elastomer composition without particular any additives having low hardness, excellent adhesion, excellent oil resistance, excellent weather resistance, excellent heat resistance, excellent tensile properties (mechanical properties), good formability, and good flexibility.

Namely, the present invention relates to a block copolymer (A) comprising a (meth)acrylic polymer block (a) and an acrylic polymer block (b), wherein a 5%-weight-loss temperature measured by thermogravimetric analysis at a heating rate of 10.0° C./min under a nitrogen stream at a flow rate of 50.0 mi/min is 300° C. or more.

The present invention also relates to a block copolymer (A) comprising a (meth)acrylic polymer block (a) and an acrylic polymer block (b), wherein a tensile strength measured according to JIS K6301 is 3 MPa or more, a hardness measured by a type A durometer according to JIS K6253 is 50 or less, and a compression set measured after 22 hours at 70° C. is 45% or less.

The present invention further relates to a soft material for automobile containing a block copolymer (A) comprising a (meth)acrylic polymer block (a) and an acrylic polymer block (b).

The present invention further relates to an automobile interior member comprising the soft material for an automobile.

The present invention further relates to an automobile exterior member comprising the soft material for an automobile.

The present invention further relates to an automobile inner layer material comprising the soft material for an automobile.

The present invention further relates to a molding material for an automobile comprising the soft material for an automobile.

The present invention further relates to an automobile hollow-molded product comprising the soft material for an automobile.

The present invention further relates to an automobile hollow-molded boot or hose comprising the soft material for an automobile.

Best Mode for Carrying Out the Invention

<Block Copolymer (A)>

A block copolymer (A) of the present invention comprises a (meth)acrylic polymer block (a) and an acrylic polymer block (b).

The block copolymer (A) preferably has a 5%-weight-loss temperature of 300° C. or more measured by thermogravimetry at a heating rate of 10.0° C./min under a nitrogen stream at a flow rate of 50.0 ml/min. Alternatively, the block copolymer (A) preferably has a tensile strength of 3.0 MPa or more measured according to JIS K6301, a hardness of 50 or less measured by a type A durometer according to JIS K6253, and a compression set of 45% or less measured after 22 hours at 70° C.

The 5%-weight-loss temperature is more preferably 310° C. or more, and most preferably 320° C. or more. With a 5%-weight-loss temperature of less than 300° C., a mixture with a thermoplastic resin having a high molding temperature and high heat resistance, such as a polycarbonate resin, a polyester resin, or a polyamide resin, deteriorates in the physical properties during molding because the block copolymer (A) is thermally decomposed.

The tensile strength is preferably 3.5 MPa or more. With a tensile strength of less than 3 MPa, the use as an elastomeric material may be limited to a narrow range of applications.

The hardness is more preferably 1 to 40, and most preferably 3 to 40. With a hardness of less than 1, rubber elasticity tends to decrease, while with a hardness of over 50, the flexibility of elastomer tends to decrease.

The compression set is more preferably 40% or less. With a compression set of over 45%, the rubber elasticity decreases.

The 5%-weight-loss temperature and the tensile strength are preferably as high as possible, while the compression set is preferably as low as possible. Furthermore, the hardness may be appropriately set according to the purpose of use.

An example of a method for producing the block copolymer (A) having the above-described properties is to introduce a functional group (c) having a high glass transition temperature (Tg) into the (meth)acrylic polymer block (a). When the (meth)acrylic polymer block is copolymerized with a monomer having a functional group with a high cohesive force, excellent thermal decomposition resistance can be imparted to the acrylic block copolymer. Therefore, the acrylic block copolymer can be suitably used even at high temperatures without degrading the inherent properties.

From the viewpoint of the magnitude of cohesive force, the functional group (c) is preferably a carboxyl group or the like. The functional group (c) may be derived from a monomer, or a functional group protected by an appropriate protective group or a precursor of the functional group may be introduced into the block copolymer (A) and then subjected to a known chemical reaction to produce the functional group (c).

At least two types of such functional groups may be used. In combination of at least two types of functional groups, functional groups which do not react with each other because they have different reaction patterns, functional groups which react with each other, or functional groups which have the same reaction pattern and different reactivities and reaction conditions may be selected. The functional groups are properly selected depending upon purposes. According to purposes, only one functional group or all functional groups may be introduced, in a form protected by a proper protective group or in the form of a functional group precursor, into the methacrylic polymer block, and then subjected to a known chemical reaction to produce the functional groups.

The preferred range of the number of the functional groups introduced varies according to the cohesive force of the functional groups (c), the structure and composition of the block copolymer (A), the number of the blocks constituting the block copolymer (A), and the introduction positions and the introduction method of the functional groups.

When the balance among the physical properties of the composition is regarded to be important, an example of the range of the number of the functional groups (c) introduced is preferably 0.1 or more, more preferably 0.2 or more, and most preferably 0.5 or more, per molecule of the block copolymer (A). The number of the functional groups (c) introduced has no upper limit, and the functional groups (c) may be introduced into all constituent monomers of the (meth)acrylic polymer block (a). The number of the functional groups (c) introduced can be set according to the properties of the intended block copolymer (A). In the description below, when the number of the functional groups introduced is below 1.0 per molecule of the block copolymer (A), the block copolymer (A) is interpreted as a mixture of the block copolymer (A) having 1.0 or more functional groups per molecule of the block copolymer (A), and the block copolymer (A) having no functional group.

The content of the functional group (c) is preferably 5% by weight or more in terms of the content of the monomers having the functional groups (c) in the constituent monomers of the (meth)acrylic polymer block (a). This is because introducing these monomers having high Tg into the hard segment enables the rubber elasticity to be expressed even at high temperatures. The content of the monomers having the functional groups (c) is more preferably 5 to 99.9% by weight. When the content of the monomers having the functional groups (c) is less than 5% by weight, the cohesive force and heat resistance of the (meth)acrylic polymer block are not sufficiently improved, and the expression of rubber elasticity at high temperatures tends to decrease. When the content of the monomers exceeds 99.9% by weight, the production tends to be difficult.

When the functional groups (c) are carboxyl groups, the block copolymer (A) of the present invention preferably has at least one carboxyl group from the viewpoint of improvement in heat resistance of the block copolymer (A).

When the block copolymer (A) of the present invention has any hydroxyl group, the block copolymer (A) preferably has at least one hydroxyl group for dynamic treatment (dynamic vulcanization) of the block copolymer (A) in the thermoplastic resin described below. With less than one hydroxyl group, the degree of crosslinking of the block copolymer (A) tends to decrease, and the effect of improving heat resistance tends to decrease.

In view of the structure of the block copolymer (A) of the present invention, the block copolymer (A) is preferably at least one selected from a linear block copolymer (b1) and a branched (star) block copolymer (b2).

The linear block copolymer (b1) may have any desired structure, but preferably contains a di-block copolymer and/or a tri-block copolymer, and more preferably contains at least one of these block copolymers as the main component, from the viewpoint of the physical properties of the composition. An example of block copolymer structures other than the di-block copolymer and the tri-block copolymer is a multi-block copolymer. Preferred examples of the structure of the block copolymer (A) of the present invention include the di-block copolymer, the tri-block copolymer, a mixture of the tri-block copolymer and the di-block copolymer, a mixture of the tri-block copolymer and the multi-block copolymer, and a mixture of the di-block copolymer, the tri-block copolymer, and the multi-block copolymer. The block copolymer more preferably contains the di-block copolymer and the tri-block copolymer among these block copolymers as the main component.

When the (meth)acrylic polymer block is represented by a and the acrylic polymer block is represented by b, the di-block copolymer is an a-b type, the tri-block copolymer is an a-b-a or b-a-b type, and the multi-block copolymer is an a-(b-a)$_n$-b, a-b-(a-b)$_n$-a, or b-(a-b)$_n$-a-b type in which n is an integer of 1 or more. From the viewpoint of impact resistance, the tri-block copolymer is preferably the a-b-a type and the multi-block copolymer is preferably the a-(b-a)$_n$-b or a-b-(a-b)$_n$-a type of these types. Also, from the viewpoint of formability, the block copolymer is preferably the a-b-a tri-block copolymer, the multi-block copolymer, or a mixture thereof, and more preferably the a-b-a tri-block copolymer.

Although the branched (star) block copolymer (b2) may have any desired structure, it preferably contains the linear block copolymer as a basic unit from the viewpoint of the physical properties of the composition.

The structure of the block copolymer can be properly selected according to purposes. For example, in use as a soft material for automobile, the structure of the block copolymer is properly selected according to the necessary properties such as formability, forming properties, mechanical properties, etc.

Furthermore, the scope of the present invention includes a block copolymer containing a homopolymer of acrylic ester, a homopolymer of methacrylic ester, or the like which is produced in the production process.

The functional group (c) may be introduced at a position in the (meth)acrylic polymer block (a), a position between the (meth)acrylic polymer block (a) and the acrylic polymer block (b), or an end of the molecular chain of the methacrylic polymer block (a).

Although the introduction method of the function group (c) is not particularly limited, the functional group (c) may be derived from a monomer or may be bound to the molecular chain directly or through a proper organic group. When the functional group (c) is derived from the monomer, the number of repeating units each comprising the monomer may be at least 1 per polymer block containing the monomer. When the number of the repeating units is 2 or more, the polymerization type of the monomer may be random copolymerization or block copolymerization. For example, the a-b di-block copolymer may be any of a (a/c)-b type, a c-a-b type, and an a-c-b type, and the a-b-a tri-block copolymer may be any of a (a/c)-b-a type, a (a/c)-b-(a/c) type, a c-a-b-a type, and a c-a-b-a-c type, wherein (a/c) means that the (meth)acrylic polymer block (a) contains the functional group (c). When two types of functional groups (c) are used, the introduction positions and introduction method of the functional groups may be freely selected within the above-described ranges, and may be properly selected according to purposes.

The number-average molecular weight of the block copolymer (A) is not particularly limited, and may be determined based on the necessary molecular weight of each of the (meth)acrylic polymer block (a) and the acrylic polymer block (b). For example, the number-average molecular weight of the block copolymer (A) preferably ranges from 30,000 to 500,000, more preferably ranges from 40,000 to 400,000, and most preferably ranges from 50,000 to 300,000, for the purpose of mainly improving the impact resistance. Also, the number-average molecular weight of the block copolymer (A) preferably ranges from 10,000 to 1,000,000, more preferably 20,000 to 700,000, and most preferably 30,000 to 400,000, for the purpose of mainly improving the processability. Furthermore, the number-average molecular weight of the block copolymer (A) preferably ranges from 10,000 to 500,000, more preferably 30,000 to 400,000, and most preferably 50,000 to 300,000, for the purpose of obtaining a compound material having elastic modulus between those of resins and elastomers. When the number-average molecular weight is small, the physical properties deteriorate, and the mechanical properties of elastomer cannot be sufficiently exhibited. When the number-average molecular weight is large, the viscosity increases, and the processability tends to decrease. Therefore, the number-average molecular weight is determined according to the balance between the required physical properties.

The molecular weight is measured in terms of polystyrene by a gel permeation chromatographic (GPC) process through a polystyrene gel column using a chloroform as an eluent.

Although the ratio (Mw/Mn) of the weight-average molecular weight (Mw) to the number-average molecular weight (Mn) of the block copolymer (A), which is measured by the gel permeation chromatography, is not particularly limited, the ratio is preferably 1.8 or less, and more preferably 1.5 or less. With a ratio Mw/Mn over 1.8, the homogeneity of the block copolymer (A) tends to decrease.

The ratios of the (meth)acrylic polymer block (a) and the acrylic polymer block (b) in the block copolymer (A) are not particularly limited, and the ratios may be determined by the physical properties required for the purpose of use, formability required in processing of the composition, and required molecular weights of the (meth)acrylic polymer block (a) and the acrylic polymer block (b).

For example, the ratios of the (meth)acrylic polymer block (a) and the acrylic polymer block (b) are preferably 5% by weight to 95% by weight and 95% by weight to 5% by weight, respectively. The ratios of the (meth)acrylic polymer block (a) and the acrylic polymer block (b) are more preferably 5% by weight to 50% by weight and 95% by weight to 50% by weight, respectively, and most preferably 10% by weight to 40% by weight and 90% by weight to 60% by weight, respectively. When the ratio of the (meth)acrylic polymer block (a) is less than 10% by weight, rubber elasticity at high temperatures tends to decrease. When the ratio exceeds 40% by weight, the mechanical properties of elastomer, particularly breaking elongation, tends to decrease.

For the purpose of mainly improving impact resistance, the ratios of the (meth)acrylic polymer block (a) and the acrylic polymer block (b) are preferably 5% by weight to 90% by weight and 95% by weight to 10% by weight, more preferably 10% by weight to 80% by weight and 90% by weight to 20% by weight, and most preferably 20% by weight to 50% by weight and 80% by weight to 50% by weight, respectively. When the ratio of the (meth)acrylic polymer block (a) is less than 5% by weight, compatibility with a thermoplastic resin decreases to cause a tendency to impair the appearance of a molded product and the weld properties. When the ratio of the acrylic polymer block (b) is less than 10% by weight, the impact resistance of a thermoplastic resin composition tends to decrease.

For the purpose of mainly improving processability, the ratios of the (meth)acrylic polymer block (a) and the acrylic polymer block (b) are preferably 5% by weight to 95% by weight and 95% by weight to 5% by weight, more preferably 10% by weight to 90% by weight and 90% by weight to 10% by weight, and most preferably 20% by weight to 80% by weight and 80% by weight to 20% by weight, respectively. For the purpose of improving processability, the amount of the block copolymer (A) added is generally smaller than that for the purpose of improving impact resistance, the block copolymer (A) can be applied to a wide range of compositions. When the ratio of the (meth)acrylic polymer block (a) is less than 5% by weight, compatibility with a thermoplastic resin decreases to cause a tendency to impair the appearance of a molded product and the physical properties of a weld. When the ratio of the acrylic polymer block (b) is less than 5% by weight, the effect of improving the processability of a thermoplastic resin composition tends to decrease.

In order to obtain a compound material having a elastic modulus between those of resins and elastomers, the ratios of the (meth)acrylic polymer block (a) and the acrylic polymer block (b) are preferably 5% by weight to 90% by weight and 95% by weight to 10% by weight, more preferably 10% by weight to 80% by weight and 90% by weight to 20% by weight, and most preferably 20% by weight to 60% by weight and 80% by weight to 40% by weight, respectively. When the ratio of the (meth)acrylic polymer block (a) is less than 5% by weight, compatibility with a thermoplastic resin decreases to cause a tendency to impair the appearance of a molded product and the physical properties of a weld. When the ratio of the acrylic polymer block (b) is less than 10% by weight, the balance of the physical properties of a thermoplastic resin composition tends to be lost.

When the block copolymer (A) of the present invention is used as a soft material for automobile, the component ratios of the (meth)acrylic polymer block (a) and the acrylic polymer block (b) of the block copolymer (A) of the present invention are preferably 5% by weight to 60% by weight and 95% by weight to 40% by weight, more preferably 10% by weight to 40% by weight and 90% by weight to 60% by weight, and most preferably 20% by weight to 40% by weight and 80% by weight to 60% by weight, respectively. In particular, from the viewpoint of the hardness, adhesive property, mechanical strength, and elongation of the soft material for automobile, the ratios of the (meth)acrylic polymer block (a) and the acrylic polymer block (b) are preferably 20% by weight to 30% by weight and 80% by weight to 70% by weight, respectively. When the ratio of the (meth)acrylic polymer block (a) is less than 5% by weight, the formability of the soft material for automobile tends to decrease. When the ratio of the acrylic polymer block (b) is less than 40% by weight, a molding of the soft material for automobile tends to increase in the tensile strength, to decrease in the adhesion, to increase in the hardness, and to decrease in the elongation of tensile property.

The ratios of the (meth)acrylic polymer block (a) and the acrylic polymer block (b) in the block copolymer (A) of the present invention may be determined according to desired physical properties such as the formability and required mechanical properties of the soft material for automobile. The scope of the present invention is not limited to the above-described ratios. For example, when the soft material for automobile is required to have good formability, low hardness, adhesion, and high mechanical properties, the soft material for automobile having the ratios of the (meth)acrylic polymer block (a) and the acrylic polymer block (b) of 10% by weight to 40% by weight and 90% by weight to 60% by weight, respectively, may be used.

Furthermore, from the viewpoint of low hardness, flexibility, adhesion, oil resistance, and heat resistance, the (meth)acrylic polymer block (a) is more preferably composed of methyl (meth)acrylate and/or methacrylic acid, and the acrylic polymer block (b) is more preferably composed of n-butyl acrylate or a mixture of n-butyl acrylate, ethyl acrylate, and 2-methoxyethyl acrylate.

From the viewpoint of low hardness, flexibility, adhesion, oil resistance, and cost, the (meth)acrylic polymer block (a) is more preferably composed of methyl (meth)acrylate, and the acrylic polymer block (b) is more preferably composed of n-butyl acrylate or a mixture of n-butyl acryl ate, ethyl acryl ate, and 2-methoxyethyl acrylate.

From the viewpoint of further improving the oil resistance as occasion demands, and improving compatibility with a thermoplastic resin in a combination therewith, the (meth)acrylic polymer block (a) is more preferably composed of 50% by weight to 100% by weight of methyl (meth)acrylate and/or methacrylic acid and 0 to 50% by weight of another vinyl monomer copolymerizable therewith, and the acrylic polymer block (b) is more preferably composed of 50% by weight to 100% by weight of n-butyl acryl ate or a mixture of n-butyl acryl ate, ethyl acryl ate, and 2-methoxyethyl acrylate and 0 to 50% by weight of another vinyl monomer copolymerizable therewith.

The glass transition temperature TgA of the (meth)acrylic polymer block (a) and the glass transition temperature TgB of the acrylic polymer block (b) in the block copolymer (A) preferably satisfy the following relation:

TgA>TgB

The glass transition temperature (Tg) of each of the (meth)acrylic polymer block (a) and the acrylic polymer block (b) can be substantially determined by the monomer contents by weight of monomers in each polymer block according to the following Fox equation:

$1/Tg=(W1/Tg1)+(W2/Tg2)+\ldots+(Wm/Tgm)$ $W1+W2+\ldots+Wm=1$

In the equation, Tg represents the glass transition temperature of the polymer block, Tg1, Tg2, . . . , Tgm each represent the glass transition temperature of a homopolymer of each monomer, and W1, W2, . . . , Wm each represent the content by weight of each monomer unit.

In the above-described Fox equation, the glass transition temperature of the homopolymer of each monomer described in, for example, Polymer Handbook Third Edition, Wiley-Interscience, 1989 may be used. Although the glass transition temperature can be measured by DSC (Differential Scanning Calorimetry) or from a tan δ peak of dynamic viscoelasticity, the measured value may deviate from a value calculated according to the Fox equation when the polarities of the (meth)acrylic polymer block (a) and the acrylic polymer block (b) are close to each other or when each block has a small number of the repeating monomer units.

<(Meth)Acrylic Polymer Block (a)>

The constituent monomers of the (meth)acrylic polymer block (a) preferably include 50% by weight to 100% by weight of methacrylic ester and 0 to 50% by weight, preferably 0 to 25% by weight, of another vinyl monomer copolymerizable therewith from the viewpoint of ease of production of the block copolymer (A) having desired physical properties, cost, and availability. When the rate of the methacrylic ester is less than 50% by weight, the weather resistance, high glass transition temperature, and compatibility with a resin, which are characteristics of a methacrylic ester, are liable to be lost. When the functional group (c) is contained in the (meth)acrylic polymer block (a), a monomer having the functional group (c) or a monomer having a functional group which is a precursor of the functional group (c) is preferably the methacrylic ester or the vinyl monomer copolymerizable therewith.

The required molecular weight of the (meth)acrylic polymer block (a) may be determined according to the required cohesive force of the (meth)acrylic polymer block (a) and the time required for polymerization thereof.

The cohesive force depends upon molecular interaction (i.e., polarity) and a degree of entanglement, and as the number-average molecular weight increases, the number of entangled sites increases to increase the cohesive force. Namely, assuming that the required molecular weight of the (meth)acrylic polymer block (a) is Ma, and the molecular weight of an entanglement strand of a polymer constituting the (meth)acrylic polymer block (a) is Mca, the range of Ma range is exemplified by the following: When cohesive force is required, Ma>Mca is preferred, and when cohesive force is further required, Ma>2×Mca is preferred. When compatibility between certain degrees of cohesive force and creep property is required, Mca<Ma<2×Mca is preferred. The molecular weight of an entanglement strand is described by, for example, Wu et al., Polym. Eng. and Sci., 1990, Vol. 30, p. 753. For example, on the assumption that the (meth)acrylic polymer block (a) is composed of methyl methacrylate alone, when cohesive force is required, the number-average molecular weight of the (meth)acrylic polymer block (a) is preferably in the range of 9200 or more. However, the polymerization time tends to increase as the number-average molecular weight increases, and thus the number-average molecular weight may be set to preferably 200,000 or less, and more preferably 100,000 or less, according to required productivity. However, when the unit (c) is contained in the (meth) acrylic polymer block (a), the number-average molecular weight can be set to a lower value because the cohesive force is imparted by the unit (c).

Examples of the (meth)acrylic ester which constitutes the (meth)acrylic polymer block (a) include methacrylic acid aliphatic hydrocarbon (for example, alkyl) esters such as methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, and stearyl methacrylate; methacrylic acid alicyclic hydrocarbon esters such as cyclohexyl methacrylate and isobornyl methacrylate; methacrylic acid aralkyl esters such as benzyl methacrylate; methacrylic acid aromatic hydrocarbon esters such as phenyl methacrylate and tolyl methacrylate; esters of methacrylic acid and functional group-containing alcohols having ether oxygen, such as 2-methoxyethyl methacrylate and 3-methoxybutyl methacrylate; methacrylic acid fluoroalkyl esters such as trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate, and 2-perfluorohexadecylethyl methacrylate; 2-hydroxyethyl methacrylate; 4-hydroxybutyl methacrylate; 2-hydroxypropyl methacrylate; glycidyl methacrylate; 2-aminoethyl methacrylate; γ-(methacryloyloxypropyl) trimethoxysilane; γ-(methacryloyloxypropyl) dimethoxymethylsilane; and ethylene oxide addition products of methacrylic acid. These methacrylates may be used alone or in a combination of two or more. In particular, methyl methacrylate is preferred from the viewpoint of compatibility with a thermoplastic resin in a combination therewith, cost and availability.

Examples of the vinyl monomer copolymerizable with the methacrylic ester which constitutes the (meth)acrylic polymer block (a) include acrylic esters, aromatic alkenyl compounds, vinyl cyanide compounds, conjugated diene compounds, halogen-containing unsaturated compounds, silicon-containing unsaturated compounds, unsaturated carboxylic acid compounds, unsaturated dicarboxylic acid compounds, vinyl ester compounds, and maleimide compounds.

Examples of the acrylic ester include acrylic acid aliphatic hydrocarbon (for example, alkyl) esters such as methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, and stearyl acrylate; acrylic acid alicyclic hydrocarbon esters such as cyclohexyl acrylate and isobornyl acrylate; acrylic acid aromatic hydrocarbon esters such as phenyl acrylate and tolyl acrylate; acrylic acid aralkyl esters such as benzyl acrylate; esters of acrylic acid with functional group-containing alcohols having ether oxygen, such as 2-methoxyethyl acrylate and 3-methoxybutyl acrylate; acrylic acid fluoroalkyl esters such as trifluoromethylmethyl acrylate, 2-trifluoromethylethyl acrylate, 2-perfluoroethylethyl acrylate, 2-perfluoroethyl-2-perfluorobutylethyl acrylate, 2-perfluoroethyl acrylate, perfluoromethyl acrylate, diperfluoromethylmethyl acrylate, 2-perfluoromethyl-2-perfluoroethylmethyl acrylate, 2-perfluorohexylethyl acrylate, 2-perfluorodecylethyl acrylate, and 2-perfluorohexadecylethyl acrylate; 2-hydroxyethyl acrylate; 4-hydroxybutyl acrylate; 2-hydroxypropyl acrylate; glycidyl acrylate; 2-aminoethyl acrylate; γ-(methacryloyloxypropyl) trimethoxysilane; γ-(methacryloyloxypropyl) dimethoxymethylsilane; and ethylene oxide addition products of acrylic acid.

Examples of the aromatic alkenyl compounds include styrene, α-methylstyrene, p-methylstyrene, and p-methoxystyrene.

Examples of the vinyl cyanide compounds include acrylonitrile and methacrylonitrile.

Examples of the conjugated diene compounds include butadiene and isoprene.

Examples of the halogen-containing unsaturated compounds include vinyl chloride, vinylidene chloride, perfluoroethylene, perfluoropropylene, and vinylidene fluoride.

Examples of the silicon-containing unsaturated compounds include vinyltrimethoxysilane and vinyltriethoxysilane.

Examples of the unsaturated carboxylic acid compounds include methacrylic acid and acrylic acid.

Examples of the unsaturated dicarboxylic acid compounds include maleic anhydride, maleic acid, maleic acid monoalkyl and dialkyl esters, fumaric acid, and fumaric acid monoalkyl and dialkyl esters.

Examples of the vinyl ester compounds include vinyl acetate, vinyl propionate, vinyl pivalate, vinyl benzoate, and vinyl cinnamate.

Examples of the maleimide compounds include maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

These copolymerizable monomers can be used alone or in a combination of two or more. The vinyl monomer is preferably selected according to compatibility of the block copolymer (A) in combination with the thermoplastic resin. When the block copolymer (A) of the present invention is used as the soft material for automobile, the vinyl monomer is preferably selected according to the formability and the required mechanical properties of the soft material for automobile. Although a methyl methacrylate polymer is substantially quantitatively depolymerized by thermal decomposition, methyl methacrylate can be copolymerized with an acrylic ester, for example, methyl acrylate, ethyl acrylate, n-butyl acrylate, or 2-methoxyethyl acrylate;

a mixture thereof; or styrene, for suppressing the depolymerization. In order to further improve the oil resistance, methyl methacrylate can be copolymerized with acrylonitrile.

The glass transition temperature of the (meth)acrylic polymer block (a) is preferably 25° C. or more, more preferably 40° C. or more, further preferably 50° C. or more, further preferably 100° C. for more, particularly preferably 105° C., and most preferably 110° C. or more. When the (meth)acrylic polymer block (a) has a glass transition temperature of less than 25° C., formability tends to decrease. Also, with a glass transition temperature of less than 100° C., the heat resistance of the resulting thermoplastic elastomer is insufficient, and thus rubber elasticity at high temperatures tends to decrease.

The glass transition temperature (Tg) of the (meth)acrylic polymer block (a) can be determined by setting the ratio by weight of each monomer constituting the polymer block according to the above-described Fox equation. The glass transition temperature is calculated according to the Fox equation using a value of the glass transition temperature of a homopolymer of each monomer described in Polymer Handbook Third Edition, Wiley-Interscience, 1989.

<Acrylic Polymer Block (b)>

The constituent monomers of the acrylic polymer block (b) preferably include 50% by weight to 100% by weight of acrylic ester and 0 to 50% by weight, preferably 0 to 25% by weight, of another vinyl monomer copolymerizable therewith from the viewpoint of ease of production of a composition having desired physical properties, cost, and availability. When the ratio of the acrylic ester is less than 50% by weight, the physical properties, particularly impact resistance and flexibility, which are characteristics of an acrylic ester, are likely to degrade.

The required molecular weight of the acrylic polymer block (b) may be determined according to the required elastic modulus and rubber elasticity of the acrylic polymer block (b), and the time required for polymerization thereof.

The elastic modulus is closely related to the mobility (i.e., glass transition temperature) and the molecular weight of a molecular chain, and the inherent elastic modulus is not exhibited unless the molecular weight is a certain value or more. This also applies to the rubber elasticity, but the molecular weight is preferably as high as possible from the viewpoint of rubber elasticity. Namely, when the necessary molecular weight of the acrylic polymer block (b) is Mb, a range of the molecular weight Mb is preferably Mb>3,000, more preferably Mb>5,000, further preferably Mb>10,000, particularly preferably Mb>20,000, and most preferably Mb>40,000. However, since the polymerization time tends to increase as the number-average molecular weight increases, the number-average molecular weight may be determined according to required productivity, and is preferably 500,000 or less, and more preferably 300,000 or less.

Examples of the acrylic ester which constitutes the acrylic polymer block (b) include acrylic acid aliphatic hydrocarbon (for example, alkyl) esters such as methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, and stearyl acrylate; acrylic acid alicyclic hydrocarbon esters such as cyclohexyl acrylate, and isobornyl acrylate; acrylic acid aromatic hydrocarbon esters such as phenyl acrylate and tolyl acrylate; acrylic acid aralkyl esters such as benzyl acrylate; esters of acrylic acid and functional group-containing alcohols having ether oxygen, such as 2-methoxyethyl acrylate and 3-methoxybutyl acrylate; acrylic acid fluoroalkyl esters such as trifluoromethylmethyl acrylate, 2-trifluoromethylethyl acrylate, 2-perfluoroethylethyl acrylate, 2-perfluoroethyl-2-perfluorobutylethyl acrylate, 2-perfluoroethyl acrylate, perfluoromethyl acrylate, diperfluoromethylmethyl acrylate, 2-perfluoromethyl-2-perfluoroethylmethyl acrylate, 2-perfluorohexylethyl acrylate, 2-perfluorodecylethyl acrylate, and 2-perfluorohexadecylethyl acrylate; 2-hydroxyethyl acrylate; 4-hydroxybutyl acrylate; 2-hydroxypropyl acrylate; glycidyl acrylate; 2-aminoethyl acrylate; γ-(methacryloyloxypropyl) trimethoxysilane; γ-(methacryloyloxypropyl) dimethoxymethylsilane; and ethylene oxide addition products of acrylic acid. These acrylic esters may be used alone or in a combination of two or more.

Among these acrylic esters, n-butyl acrylate is preferred from the viewpoint of impact resistance of a thermoplastic resin composition, cost and availability. When the composition is required to have oil resistance, ethyl acrylate is preferred. When low-temperature characteristics are required, 2-ethylhexyl acrylate is preferred. When both the oil resistance and the low-temperature characteristics are desired to be satisfied, a mixture of n-ethyl acrylate, n-butyl acrylate, and 2-methoxyethyl acrylate is preferred. When the block copolymer (A) of the present invention is used as the soft material for automobile, n-butyl acrylate or a mixture of n-butyl acrylate, ethyl acrylate, and 2-methoxyethyl acrylate is preferred from the viewpoint of the flexibility and oil resistance of a molding of the soft material for automobile, and availability.

Examples of the vinyl monomer copolymerizable with the acrylic ester which constitutes the acrylic polymer block (b) include methacrylic esters, aromatic alkenyl compounds, vinyl cyanide compounds, conjugated diene compounds, halogen-containing unsaturated compounds, silicon-containing unsaturated compounds, unsaturated carboxylic acid compounds, unsaturated dicarboxylic acid compounds, vinyl ester compounds, and maleimide compounds.

Examples of the methacrylic ester include methacrylic acid aliphatic hydrocarbon (for example, alkyl) esters such as methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, and stearyl methacrylate; methacrylic acid alicyclic hydrocarbon esters such as cyclohexyl methacrylate and isobornyl methacrylate; methacrylic acid aralkyl esters such as benzyl methacrylate; methacrylic acid aromatic hydrocarbon esters such as phenyl methacrylate and tolyl methacrylate; esters of methacrylic acid and functional group-containing alcohols having ether oxygen, such as 2-methoxyethyl methacrylate and 3-methoxybutyl methacrylate; methacrylic acid fluoroalkyl esters such as trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate, and 2-perfluorohexadecylethyl methacrylate; 2-hydroxyethyl methacrylate; 2-hydroxypropyl methacrylate; glycidyl methacrylate; 2-aminoethyl methacrylate; γ-(methacryloyloxypropyl) trimethoxysilane; γ-(methacryloyloxypropyl) dimethoxymethylsilane; and ethylene oxide addition products of methacrylic acid.

Examples of the aromatic alkenyl compounds include styrene, α-methylstyrene, p-methylstyrene, and p-methoxystyrene.

Examples of the vinyl cyanide compounds include acrylonitrile and methacrylonitrile.

Examples of the conjugated diene compounds include butadiene and isoprene.

Examples of the halogen-containing unsaturated compounds include vinyl chloride, vinylidene chloride, perfluoroethylene, perfluoropropylene, and vinylidene fluoride.

Examples of the silicon-containing unsaturated compounds include vinyltrimethoxysilane and vinyltriethoxysilane.

Examples of the unsaturated carboxylic acid compounds include methacrylic acid and acrylic acid.

Examples of the unsaturated dicarboxylic acid compounds include maleic anhydride, maleic acid, maleic acid monoalkyl and dialkyl esters, fumaric acid, and fumaric acid monoalkyl and dialkyl esters.

Examples of the vinyl ester compounds include vinyl acetate, vinyl propionate, vinyl pivalate, vinyl benzoate, and vinyl cinnamate.

Examples of the maleimide compounds include maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

These copolymerizable vinyl monomers can be used alone or in a combination of two or more. The vinyl monomer is preferably selected according to the required glass transition temperature, elastic modulus and polarity of the acrylic polymer block (b), and the required physical properties of a composition. For example, acrylonitrile may be copolymerized for improving the oil resistance of the composition. Also, when the oil resistance is required, a mixture of n-butyl acrylate, ethyl acrylate, and 2-methoxyethyl acrylate can be used.

When the block copolymer (A) of the present invention is used as the soft material for automobile, the glass transition temperature of the acrylic polymer block (b) is preferably 25° C. or less, more preferably 0° C. or less, and most preferably −20° C. or less. With a glass transition temperature of over 25° C., the flexibility and low-temperature characteristics of a molding of the soft material for automobile tend to decrease.

<Functional Group (c)>

The functional group (c) is preferably a carboxyl group and can be selected according to demand.

As a method for introducing the functional group (c), the functional group (c) is preferably introduced by direct polymerization when a monomer having the functional group does not poison a catalyst under polymerization conditions, and the functional group (c) is preferably introduced by functional group conversion when a monomer having the functional group deactivates the catalyst during polymerization. The latter method will be described below.

In the method for introducing the functional group (c) by converting functional group, the functional group (c) protected by an appropriate protective group or a precursor functional group of the functional group (c) may be introduced into the block copolymer (A) and then subjected to a known chemical reaction to produce the functional group. This method can introduce a carboxyl group.

An example of a method for synthesizing the block copolymer (A) having a carboxyl group comprises synthesizing a block copolymer containing a monomer having a precursor functional group of a carboxyl group, such as tert-butyl methacrylate, tert-butyl acrylate, trimethylsilyl methacrylate, or trimethylsilyl acrylate, and then effecting a known chemical reaction such as hydrolysis or acidolysis to produce a carboxyl group.

Japanese Unexamined Patent Application Publication Nos. 10-298248 and 2001-234146 disclose that an acrylic block copolymer having a carboxyl group is synthesized by functional group conversion. However, in these publications, the effect of introduction of a functional group on the thermal decomposition resistance of the acrylic block copolymer is not mentioned.

A functional group such as a carboxyl group has high cohesive force, and a monomer having the functional group has a high glass transition temperature (Tg) and has the effect of improving the thermal decomposition resistance of the block copolymer (A). Although a functional group such as a hydroxyl group has a hydrogen bonding ability, a monomer having such a functional group has low Tg and a small effect of improving thermal decomposition resistance, as compared with the monomer having a carboxyl group.

A polymer having a carboxyl group has a high glass transition temperature, for example, 228° C. for polymethacrylic acid and 106° C. for polyacrylic acid, and the introduction of a constituent monomer of such a polymer can improve the thermal decomposition resistance of the block copolymer (A).

The physical properties of the block copolymer (A) of the present invention can be measured by the methods described below.

(Thermal Decomposition Resistance)

A 5%-weight-loss temperature is measured by thermogravimetric analysis at a heating rate of 10.0° C./min at a flow rate of 50.0 ml/min under a nitrogen atmosphere. The term "5%-weight-loss temperature" means a temperature where the weight (MT) of a sample satisfies the following equation in continuous heating under the above-described conditions. In the equation, M100 represents the weight of the sample at 100° C.

$$5.00 = (M100 - MT)/M100 \times 100$$

(Mechanical Strength (Tensile Strength))

Although mechanical strength can be measured according to JIS K6301, it can also be measured by a method similar to JIS K6301. For example, measurement according to the method of JIS K7113 is regarded as a similar evaluation method in the present invention.

(Hardness)

Hardness at 23° C. (initial value according to JIS A) is measured according to JIS K6253. However, when a hardness measured by a type A durometer exceeds 90, the hardness is measured by a type D durometer (JIS D).

(Compression Set)

According to JIS K6301, a cylindrical molded sample is held at 70° C. for 22 hours at a compression rate of 25% and allowed to stand at room temperature for 30 minutes. Then, the thickness is measured to determine residual set. Namely, a compression set of 0% corresponds to complete recovery, and a compression set of 100% corresponds to no recovery.

<Method for Producing the Block Copolymer (A)>

Although the method for producing the block copolymer (A) is not particularly limited, controlled polymerization using a initiator is preferably used. Examples of controlled polymerization include living anionic polymerization, radical polymerization in the presence of a chain transfer agent, and living radical polymerization recently developed. Of these polymerization methods, the living radical polymerization is particularly preferred from the viewpoint of control of the molecular weight of the block copolymer (A) and its structure.

The living radical polymerization is radical polymerization in which the activity of a polymerization terminal is maintained. Although, in a restricted sense, the term "living polymerization" means polymerization in which the terminal activity is maintained, the term generally includes pseudo-living polymerization in which inactivated terminal and activated terminal are in an equilibrium state. Herein, the latter definition of living polymerization is used. In recent years, living radical polymerization has been intensively studied in many groups.

Examples of living radical polymerization include polymerization using a polysulfide as a chain transfer agent, polymerization using a cobalt-porphyrin complex (J. Am. Chem. Soc., 1994, Vol. 116, p. 7943) or a nitroxide compound as a radical scavenger (Macromolecules, 1994, Vol. 27, p. 7228), and atom transfer radical polymerization (ATRP) using an organohalogen compound functioning as an initiator and a transition metal complex functioning as a catalyst. Although, in the present invention, any one of these methods may be used, the atom transfer radical polymerization is preferred from the viewpoint of ease of control.

The atom transfer radical polymerization uses an organohalogen compound or a sulfonyl halide compound functioning as an initiator, and a metal complex mainly composed of a metal of the Group VIII, IX, X or XI elements in the periodic table as a catalyst (refer to, for example, Matyjaszewski et. al, Journal of American Chemical Society, 1995, Vol. 117, p. 5614; Macromolecules, 1995, Vol. 28, p. 7901; Science, 1996, Vol. 272, p. 866; or Sawamoto et. al, Macromolecules, 1995, Vol. 28, p. 1721).

In these methods, radical polymerization generally has a high rate of polymerization, and easily produces a termination reaction such as coupling of radicals. According to these methods, however, the polymerization proceeds in a living manner and can produce a polymer having a narrow molecular-weight distribution (Mw/Mn=1.1 to 1.5), and the molecular weight can be freely controlled by adjusting the ratio of the monomer to the initiator at the time of feeding.

In the atom transfer radical polymerization method, a monofunctional, difunctional or polyfunctional compound can be used as an organohalogen compound or a sulfonyl halide compound functioning as the initiator. These compounds can be properly used according to purposes. Namely, a monofunctional compound is preferably used for producing a di-block copolymer from the viewpoint of availability of the initiator. A difunctional compound is preferably used for producing an a-b-a tri-bock copolymer or a b-a-b tri-block copolymer from the viewpoint of the number of the reaction steps and the short reaction time. A polyfunctional compound is preferably used for producing a branched block copolymer from the viewpoint of the number of the reaction steps and the short reaction time.

Alternatively, a polymeric initiator can be used. The polymeric initiator is a polymer compound having a halogen atom bound at an end of its molecular chain among the organohalogen compounds and the sulfonyl halide compounds. Such a polymeric initiator can be produced by a controlled polymerization method other than the living radical polymerization method. Therefore, the polymeric initiator has the characteristic that the block copolymer (A) comprising polymers prepared by different polymerization methods and bonded together can be produced.

Examples of the monofunctional compounds include compounds represented by the following formulae:

$C_6H_5-CH_2X$;
$C_6H_5-C(H)(X)-CH_3$;
$C_6H_5-C(X)(CH_3)_2$;
$R^1-C(H)(X)-COOR^2$;
$R^1-C(CH_3)(X)-COOR^2$;
$R^1-C(H)(X)-CO-R^2$;
$R^1-C(CH_3)(X)-CO-R^2$; and
$R^1-C_6H_4-SO_2X$.

In these formulae, $C_6H_5$ represents a phenyl group, $C_6H_4$ represents a phenylene group (may be an ortho-, metha- or para-substituted group), $R^1$ represents a hydrogen atom, an alkyl group having 1 to 20 carbon atoms, an aryl group having 6 to 20 carbon atoms, or an aralkyl group having 7 to 20 carbon atoms, X represents chlorine, bromine, or iodine, and $R^2$ represents a monovalent organic group having 1 to 20 carbon atoms.

Examples of the alkyl group $R^1$ (containing an alycyclic hydrocarbon group) having 1 to 20 carbon atoms include a methyl group, an ethyl group, a propyl group, an isopropyl group, a n-butyl group, an isobutyl group, a tert-butyl group, a n-pentyl group, a n-hexyl group, a cyclohexyl group, a n-heptyl group, a n-octyl group, a 2-ethylhexyl group, a nonyl group, a decyl group, a dodecyl group, and an isobornyl group. Examples of the aryl group having 6 to 20 carbon atoms include a phenyl group, a tolyl group, and a naphthyl group. Examples of the aralkyl group having 7 to carbon atoms include a benzyl group, and a phenethyl group.

Examples of the monofunctional compound include tosyl bromide, methyl 2-bromopropionate, ethyl 2-bromopropionate, butyl 2-bromopropionate, methyl 2-bromoisobutyrate, ethyl 2-bromoisobutyrate, and butyl 2-bromoisobutyrate. Among these compounds, ethyl 2-bromopropionate and butyl 2-bromopropionate are preferred from the viewpoint of polymerization control because they are similar in structure to acrylic ester monomers.

Examples of the difunctional compound include compounds represented by the following formulae:
XCH$_2$—C$_6$H$_4$—CH$_2$—X;
XCH(CH$_3$)—C$_6$H$_4$—CH(CH$_3$)—X;
XC(CH$_3$)$_2$—C$_6$H$_4$—C(CH$_3$)$_2$—X;
XCH(COOR$^3$)—(CH$_2$)$_n$—CH(COOR$^3$)—X;
XC(CH$_3$)(COOR$^3$)—(CH$_2$)$_n$—C(CH$_3$)(COOR$^3$)—X;
XCH(COR$^3$)—(CH$_2$)$_n$—CH(COR$^3$)—X;
XC(CH$_3$)(COR$^3$)—(CH$_2$)$_n$—C(CH$_3$)(COR$^3$)—X;
XCH$_2$—CO—CH$_2$—X;
XCH(CH$_3$)—CO—CH(CH$_3$)—X;
XC(CH$_3$)$_2$—CO—C(CH$_3$)$_2$—X;
XCH(C$_6$H$_5$)—CO—CH(C$_6$H$_5$)—X;
XCH$_2$—COO—(CH$_2$)$_n$—OCO—CH$_2$—X;
XCH(CH$_3$)—COO—(CH$_2$)$_n$—OCO—CH(CH$_3$)—X;
XC(CH$_3$)$_2$—COO—(CH$_2$)$_n$—OCO—C(CH$_3$)$_2$—X;
XCH$_2$—CO—CO—CH$_2$—X;
XCH(CH$_3$)—CO—CO—CH(CH$_3$)—X;
XC(CH$_3$)$_2$—CO—CO—C(CH$_3$)$_2$—X;
XCH$_2$—COO—C$_6$H$_4$—OCO—CH$_2$—X;
XCH(CH$_3$)—COO—C$_6$H$_4$—OCO—CH(CH$_3$)—X;
XC(CH$_3$)$_2$—COO—C$_6$H$_4$—OCO—C(CH$_3$)$_2$—X; and
XSO$_2$—C$_6$H$_4$—SO$_2$—X.

In these formulae, R$^3$ represents an alkyl group having 1 to 20 carbon atoms, an aryl group having 6 to 20 carbon atoms, or an aralkyl group having 7 to 20 carbon atoms, n represents an integer of 0 to 20, and C$_6$H$_5$, C$_6$H$_4$, and X are also defined as described above.

Since examples of the alkyl group R$^3$ having 1 to 20 carbon atoms, the aryl group R$^3$ having 6 to 20 carbon atoms, and the aralkyl group R$^3$ having 7 to 20 carbon atoms are the same as those of the alkyl group R$^1$ having 1 to 20 carbon atoms, the aryl group R$^1$ having 6 to 20 carbon atoms, and the aralkyl group R$^1$ having 7 to 20 carbon atoms, respectively, the description thereof is omitted.

Examples of the difunctional compound include bis(bromomethyl)benzene, bis(1-bromoethyl)benzene, bis(1-bromoisopropyl)benzene, dimethyl 2,3-dibromosuccinate, diethyl 2,3-dibromosuccinate, dibutyl 2,3-dibromosuccinate, dimethyl 2,4-dibromoglutarate, diethyl 2,4-dibromoglutarate, dibutyl 2,4-dibromoglutarate, dimethyl 2,5-dibromoadipate, diethyl 2,5-dibromoadipate, dibutyl 2,5-dibromoadipate, dimethyl 2,6-dibromopimelate, diethyl 2,6-dibromopimelate, dibutyl 2,6-dibromopimelate, dimethyl 2,7-dibromosuberate, diethyl 2,7-dibromosuberate, and dibutyl 2,7-dibromosuberate. Among these compounds, bis(bromomethyl)benzene, diethyl 2,5-dibromoadipate, and diethyl 2,6-dibromopimelate are preferred from the viewpoint of availability of raw materials.

Examples of the polyfunctional compound include compounds represented by the following formulae:
C$_6$H$_3$—(CH$_2$—X)$_3$;
C$_6$H$_3$—(CH(CH$_3$)—X)$_3$;
C$_6$H$_3$—(C(CH$_3$)$_2$—X)$_3$;
C$_6$H$_3$—(OCO—CH$_2$—X)$_3$;
C$_6$H$_3$—(OCO—CH(CH$_3$)—X)$_3$;
C$_6$H$_3$—(OCO—C(CH$_3$)$_2$—X)$_3$; and
C$_6$H$_3$—(SO$_2$—X)$_3$.

In these formulae, C$_6$H$_3$ is a trivalent phenyl group (the three bond sites include any of the 1- to 6-positions), and X is defined as described above.

Examples of the polyfunctional compound include tris(bromomethyl)benzene, tris(1-bromoethyl)benzene, and tris(1-bromoisopropyl)benzene. Of these compounds, tris(bromomethyl)benzene is preferred from the viewpoint of availability of raw materials.

When an organohalogen compound or sulfonyl halide compound having a functional group other than a group for initiating polymerization is used, a polymer in which a functional group other than a group for initiating polymerization is introduced at the end or in the molecule can easily be produced. Examples of such a functional group other than the group for initiating polymerization include an alkenyl group, a hydroxyl group, an epoxy group, an amino group, an amido group, and a silyl group.

The organohalogen compound or the sulfonyl halide compound used as the initiator has a carbon atom bound to a halogen group (halogen atom) and also bound to a carbonyl group or phenyl group, and thus a carbon-halogen bond is activated to initiate polymerization. The amount of the initiator used may be determined based on the ratio to the monomer used according to the required molecular weight of the block copolymer (A). Namely, the molecular weight of the block copolymer (A) can be controlled by adjusting the number of the monomer molecules used per molecule of the initiator.

Although the transition metal complex used as the catalyst of the atom transfer radical polymerization is not particularly limited, complexes of monovalent or zero-valent copper, divalent ruthenium, divalent iron, and divalent nickel are preferred.

In particular, copper complexes are preferred from the viewpoint of cost and reaction control. Examples of monovalent copper compounds include cuprous chloride, cuprous bromide, cuprous iodide, cuprous cyanide, cuprous oxide, and cuprous perchlorate. Of these compounds, cuprous chloride and cuprous bromide are preferred from the viewpoint of control of polymerization. In the use of a monovalent copper compound, a ligand may be added for improving catalytic activity, and examples of the ligand include 2,2'-bipyridyl compounds such as 2,2'-bipyridyl and its derivatives (for example, 4,4'-dinoryl-2,2'-bipyridyl and 4,4'-di(5-noryl)-2,2'-bipyridyl); 1,10-phenanthroline compounds such as 1,10-phenanthroline and its derivatives (for example, 4,7-dinoryl-1,10-phenanthroline and 5,6-dinoryl-1,10-phenanthroline); polyamines such as tetramethylethylenediamine (TMEDA), pentamethyl diethylenetriamine, and hexamethyl (2-aminoethyl)amine.

A tristriphenylphosphine complex (RuCl$_2$(PPh$_3$)$_3$) of divalent ruthenium chloride is also preferred as the catalyst. In the use of a ruthenium compound, an aluminum alkoxide may be added as an activating agent. Furthermore, istriphenylphosphine complex (FeCl$_2$(PPh$_3$)$_2$) of divalent iron, bistriphenylphosphine complex (NiCl$_2$(PPh$_3$)$_2$) of divalent nickel, and bistributylphosphine complex (NiBr$_2$(PBu$_3$)$_2$) of divalent nickel are preferably used as the catalyst.

Although the catalyst, ligand and activating agent used are not particularly limited, they may be properly determined in consideration of the initiator, monomer and solvent used and the required reaction rate. For example, in order to polymerize an acrylic monomer such as an acrylic ester, the propagation end of a polymer chain preferably has a carbon-bromine bond from the viewpoint of control of polymerization. Therefore, an organobromine compound or sulfonyl bromide compound is preferably used as the initiator; acetonitrile is preferably used as the solvent; copper bromide, preferably a metal complex composed of copper of cuprous bromide as a central metal, is used as the catalyst; and pentamethyl diethylenetriamine is preferably used as the ligand. In order to polymerize a methacrylic monomer such as a methacrylic ester, the propagation end of a polymer chain preferably has a carbon-chlorine bond from the viewpoint of control of polymerization. Therefore, an organochlorine compound or sulfonyl chloride compound is preferably used as the initiator; acetonitrile or a mixture of acetonitrile and toluene according to demand is preferably used as the solvent; copper chloride, preferably a metal complex composed of copper of cuprous chloride as a central metal, is used as the catalyst; and pentamethyl diethylenetriamine is preferably used as the ligand.

The amounts of the catalyst and ligand used may be determined in consideration of the initiator, monomer and solvent used and the required reaction rate. For example, the initiator/monomer ratio must be decreased for producing a polymer having a high molecular weight, as compared with that for producing a polymer having a low molecular weight. In such a case, the reaction rate can be increased by increasing the amounts of the catalyst and ligand. When an appropriate organic solvent is added for decreasing the viscosity of the polymerization system and increasing the stirring efficiency in order to produce a polymer having a glass transition temperature higher than room temperature, the reaction rate tends to decrease. In such a case, the reaction rate can be increased by increasing the amounts of the catalyst and ligand used.

The atom transfer radical polymerization can be performed in the absence of a solvent (bulk polymerization) or in any of various solvents. Also, bulk polymerization or polymerization in any of various solvents can be suspended in the course of polymerization.

Examples of the solvent include hydrocarbon solvents, ether solvents, halogenated hydrocarbon solvents, ketone solvents, alcohol solvents, nitrile solvents, ester solvents, and carbonate solvents.

Examples of the hydrocarbon solvents include benzene and toluene; examples of the ether solvents include diethyl ether and tetrahydrofuran; examples of the halogenated hydrocarbon solvents include methylene chloride and chloroform; examples of the ketone solvents include acetone, methyl ethyl ketone, and methyl isobutyl ketone; examples of the alcohol solvents include methanol, ethanol, propanol, isopropanol, n-butanol, tert-butanol; examples of the nitrile solvents include acetonitrile, propionitrile, and benzonitrile; examples of the ester solvents include ethyl acetate and butyl acetate; and examples of the carbonate solvents include ethylene carbonate and propylene carbonate.

These solvents may be used alone or in a combination of two or more.

When a solvent is used, the amount of the solvent used may be properly determined based on the relation between the viscosity of the whole system and the required stirring efficiency (i.e., reaction rate). When bulk polymerization or polymerization in a solvent is suspended in the course of polymerization, the conversion rate of the monomer at the suspended point of reaction may also be properly determined based on the relation between the viscosity of the whole system and the required stirring efficiency (i.e., reaction rate).

The polymerization can be performed in the range of room temperature to 200° C., and preferably in the range of 50° C. to 150° C.

Examples of a method for producing the block copolymer (A) by the above-described polymerization include a method of successively adding the monomers, a method of polymerizing a next block in the presence of the previously synthesized polymer functioning as the polymeric initiator, and a method of linking separately prepared polymers by reaction. Any one of these polymerization methods may be properly used according to the purpose. The method of successively adding the monomers is preferred from the viewpoint of ease of production, and the method of polymerizing a next block in the presence of the previously synthesized polymer functioning as the polymeric initiator is preferred for avoiding the remaining monomer of the previous block from being copolymerized with the next block.

Although the method of successively adding the monomers and the method of polymerizing a next block in the presence of the previously synthesized polymer functioning as the polymeric initiator will be described in detail below, the method for producing the block copolymer (A) of the present invention is not limited to these methods.

In the method of successively adding the monomers, preferably, a first monomer is polymerized until the conversion rate of the monomer becomes 80 to 95%, and a second monomer is then added. When the polymerization proceeds until the conversion rate exceeds 95% (for example, 96% to 100%), the propagation reaction of the polymer chain is stochastically decreased, and polymer radicals easily react with each other to cause side reaction such as disproportionation, coupling, or chain transfer. When the second monomer is added at a conversion rate of less than 80% (for example, 79% or less), there is a problem that the first monomer may become mixed and copolymerized with the second monomer.

In this case, possible methods for adding the monomers include a method (x1) in which an acrylic monomer is first added and polymerized, and then a methacrylic monomer is added and polymerized, and a method (y1) in which the methacrylic monomer is first added and polymerized, and then the acrylic monomer is added and polymerized. However, the method (x1) in which the acrylic monomer is first added and polymerized, and then the methacrylic monomer is added and polymerized is preferred from the viewpoint of control of polymerization. This is because the (meth)acrylic polymer block is preferably grown from an end of the acrylic polymer block.

In an example of the method of polymerizing a next block in the presence of the previously synthesized polymer used as the polymeric initiator, the temperature is decreased to suspend polymerization in a living state at a desired time of the polymerization of a first block, the monomer of the first polymer block is distilled off under reduced pressure, and then the monomer of a second block is added. When a third block is polymerized, the same operation as that for the second block may be applied. This method can avoid copolymerization of the remaining monomer for the prior block during polymerization of the second block and subsequent blocks.

In this case, possible methods for block polymerization include a method (x2) in which the acrylic block is first polymerized, and then the methacrylic block is polymerized, and a method (y2) in which the methacrylic block is polymerized, and then the acrylic block is polymerized. However, the method (x2) in which the acrylic block is first polymerized, and then the methacrylic block is polymerized is preferred from the viewpoint of control of polymerization. This is because the (meth)acrylic polymer block is preferably grown from the end of the acrylic polymer block.

The method for determining the conversion rate of the acrylic monomer, the methacrylic monomer, and the like will be described below. A gas chromatographic (GC) method and a gravimetric method can be applied to determine the conversion rate. The GC method includes sampling reaction solutions from the polymerization system at the start of reaction and in the course of reaction, and then determining the consumption rate of the monomer from the ratio of the monomer to the internal standard material previously added to the polymerization system in the GC measurement. This method is advantageous in that when plural types of monomers are present in the system, the conversion rates of the monomers can be independently determined. The gravimetric method includes sampling a reaction solution from the polymerization system, and determining the solid content from the weights of the sample before and after drying to determine the conversion rate of the monomers as a whole. This method is advantageous in that the conversion rate can be easily determined. When plural types of monomers are present in the system, for example, when an acrylic monomer is present as a comonomer of a methacrylic monomer, the GC method between these methods is preferred.

The reaction solution obtained by polymerization contains a mixture of a polymer and a metal complex. Therefore, an organic acid having a carboxyl group or a sulfonyl group is added to the reaction solution to produce a metal salt with a metal complex, and the resulting metal salt is filtered off to remove the solid content. Then, impurities such as acids remaining in the solution are removed by adsorption on basic activated alumina, a basic adsorbent, a solid inorganic acid, an anion exchange resin, or a cellulose anion exchanger to produce an acrylic block copolymer resin solution.

The resultant polymer solution is then evaporated to remove the polymerization solvent and unreacted monomers, thereby isolating the block polymer (A). As the evaporation system, a thin film evaporation system, a flash evaporation system, or a horizontal evaporation system with an extrusion screw can be used. Since the acrylic block copolymer (A) is adhesive, the horizontal evaporation system with the extrusion screw among the above evaporation systems, or a combination with another evaporation system is effective for evaporation.

Although the method for converting a functional group being a precursor of a carboxyl group to the carboxyl group is not limited, a preferred method includes diluting the block copolymer (A) having a functional group being the precursor of a carboxyl group with a solvent, and then heating the solution in the presence of an acid catalyst. In this method, acidolysis can be performed in the absence of water, or hydrolysis can be performed in the presence of water. Any one of these reaction systems can be selected in consideration of ease of reaction and by-products.

Examples of the solvent usable in the reaction include hydrocarbon solvents, ether solvents, halogenated hydrocarbon solvents, ketone solvents, alcohol solvents, nitrile solvents, ester solvents, and carbonate solvents. Examples of the hydrocarbon solvents include benzene and toluene.

Examples of the ether solvents include diethyl ether and tetrahydrofuran; examples of the halogenated hydrocarbon solvents include methylene chloride and chloroform; examples of the ketone solvents include acetone, methyl ethyl ketone, and methyl isobutyl ketone; examples of the alcohol solvents include methanol, ethanol, propanol, isopropanol, n-butanol, tert-butanol; examples of the nitrile solvents include acetonitrile, propionitrile, and benzonitrile; examples of the ester solvents include ethyl acetate and butyl acetate; examples of the carbonate solvents include ethylene carbonate and propylene carbonate. These solvents may be used alone or in a combination of two or more.

As the acid catalyst, an organic acid such as p-toluenesulfonic acid or benzenesulfonic acid, an inorganic acid such as hydrochloric acid or sulfuric acid, or a $H^+$ ion exchange resin such as a sulfonic acid ion exchange resin can be used. When the organic acid or inorganic acid is used, the amount of the acid catalyst added is preferably 0.1 to 20 parts by weight, and more preferably 1 to 5 parts by weight, based on 100 parts by weight of the block copolymer (A). When the $H^+$ ion exchange resin is used, the amount of the acid catalyst added is preferably 0.1 to 20 parts by weight, and more preferably 1 to 10 parts by weight.

The heating temperature in the presence of the acid catalyst is preferably 50° C. or more, and it can be determined according to the reflux temperature of the diluent solvent. When the temperature is excessively high, however, the (meth)acrylic ester segment other than the precursor segment of a carboxyl group may be decomposed. Thus, the temperature is preferably 160° C. or less, more preferably 140° C. or less, and most preferably 80 to 140° C.

The block copolymer (A) produced in the present invention is significantly improved in compression set at high temperatures while maintaining inherent properties of the acrylic block copolymer. For example, the block copolymer (A) can be suitably used for producing hoses, sheets, films, contour-extrusion molded products, various injection-molded products useful in the fields of packaging materials, construction and civil engineering materials, materials for automobile, materials for household electric appliances, and materials for other miscellaneous goods. Such products can be formed by molding processes for ordinary thermoplastic resins, such as injection molding, extrusion, or calendering. The block copolymer (A) can also be used as an elastomeric material, a modifier of a resin, a modifier of a rubber, a modifier of an asphalt, a base polymer of an damping agent and adhesive, and a component of a resin modifier.

<Thermoplastic Resin (B)>

The block copolymer (A) of the present invention can be used as a composition in combination with a thermoplastic resin. Examples of the thermoplastic resin (B) used for this purpose include poly(vinyl chloride) resins, polyethylene resins, polypropylene resins, cyclic olefin copolymer resins, poly(methyl methacrylate) resins, polystyrene resins, poly (phenylene ether) resins, polycarbonate resins, polyester resins, polyamide resins, polyacetal resins, poly(phenylene sulfide) resins, polysulfone resins, polyimide resins, polyetherimide resins, polyetherketone resins, polyetheretherketone resins, and polyamide-imide resins. These resins may be used alone or in a combination of two or more.

<Soft Material for Automobile>

The soft material for automobile of the present invention comprises the block copolymer (A) used as an essential component. However, when sufficient performance cannot be achieved with only the block copolymer (A), other components may be added for improving the properties such as mechanical strength, hardness, and heat resistance.

When the thermoplastic resin (B) is added as another component, examples of the thermoplastic resin (B) include polyacrylic resins, poly(vinyl chloride) resins, polyethylene resins, polypropylene resins, cyclic olefin copolymer resins, and homopolymers or copolymers produced by polymerizing 70% by weight to 100% by weight of at least one vinyl monomer selected from the group consisting of aromatic alkenyl compounds and vinyl cyanide compounds and 0% by weight to 30% by weight of another copolymerizable vinyl monomer, such as ethylene, propylene, or vinyl acetate, and/or a copolymerizable diene monomer such as butadiene or isoprene. Other examples of the thermoplastic resin (B) include polystyrene resins, poly(phenylene ether) resins, mixtures of polystyrene resins and poly(phenylene ether) resins, polycarbonate resins, polyester resins, mixtures of polycarbonate resins and polyester resins, polyamide resins, polyacetal resins, poly(phenylene sulfide) resins, polysulfone resins, polyimide resins, poly(ether imide) resins, polyetherketone resins, polyetheretherketone resins, polyamide-imide resins, and polyarylate resins. These resins may be used alone or in a mixture of two or more.

In the present invention, the thermoplastic resin is not limited to these resins, and any of various thermoplastic resins can be widely used. A styrene elastomer, an olefin elastomer, a urethanic elastomer, a vinyl chloride elastomer, an amide elastomer, or an ester elastomer may be used as the thermoplastic resin. Further examples of the thermoplastic resin include graft copolymers such as methyl methacrylate-butadiene-styrene copolymers (MBS resins), such as KANEACE B Series and KANEACE M Series (produced by Kaneka Corporation); acrylic graft copolymers such as KANEACE FM Series (produced by Kaneka Corporation); and acryl-silicone composite rubber graft copolymers such as META-BLEN S-2001 (produced by Mitsubishi Rayon Co., Ltd.); core-shell particle type-graft copolymers each containing an inner layer (core) and an outer layer (shell); three-layer core-shell particle type-graft copolymers each containing a central layer, an intermediate layer, and an outer layer; and salami-structure polymers.

Among the various thermoplastic resins, the thermoplastic resin is preferably selected from the group consisting of acrylic resins such as poly(methyl acrylate), poly(vinyl chloride), acrylonitrile-styrene copolymers, acrylonitrile-butadiene-styrene copolymers, methyl methacrylate-styrene copolymers, polycarbonate, methyl methacrylate-butadiene-styrene copolymers, acrylic graft copolymers, polyester resins, and polyamide resins in the view of the excellent compatibility with the block copolymer (A) used in the present invention, excellent impact resistance, and excellent mechanical properties. In the view of cost and fluidity, polyethylene resins and polypropylene resins are preferred.

In particular, polyamide resins and polyester resins are more preferred in view of the oil resistance and heat resistance of the resultant thermoplastic elastomer, and compatibility with the (meth)acrylic block copolymer (A).

Examples of the polyamide resins include aliphatic polyamides by ring opening polymerization such as PA6 (polycaproamide) and PA12 (polydodecaneamide); polyamides by polycondensation polymerization such as PA66 (poly(hexamethylene adipamide)), PA46 (poly(tetramethylene adipamide)), PA610, PA612, and PA11; semi-aromatic polyamides such as MXD6, PA6T, PA9T, PA6T/66, PA6T/6, and amorphous PA; fully aromatic polyamides such as poly(p-phenylene terephthalamide), poly(m-phenylene terephthalamide), and poly(m-phenylene isophthalamide). Examples of the polyester resins include aliphatic polyesters such as polyglycolic acid, polylactic acid, polycaprolactone, and poly(ethylene succinate); semi-aromatic polyesters such as poly(ethylene terephthalate), poly(trimethylene terephthalate), poly(butylene terephthalate), poly(ethylene naphthalate), poly(cyclohexanedimethylene terephthalate), ethylene terephthalate/cyclohexanedimethylene terephthalate copolymers, and thermotropic liquid crystal polymer type 2; fully aromatic polyesters such as amorphous polyarylate, thermotropic liquid crystal polymer type 1, and thermotropic liquid crystal polymer type 2. Among these polymers, from the viewpoint of cost and balance between the physical properties, aliphatic polyamides by ring opening polymerization such as PA6 (polycaproamide) and PA12 (polydodecaneamide); polyamides by polycondensation polymerization such as PA66 (poly(hexamethylene adipamide)), PA46 (poly(tetramethylene adipamide)), PA610, PA612, and PA11; and semi-aromatic polyesters such as poly(ethylene terephthalate) and poly(butylene terephthalate) are particularly preferred.

The thermoplastic resin is not limited to these resins, and these resins may be used alone or in a combination of two or more.

Although the ratio of the block copolymer (A) to the thermoplastic resin (B) is not particularly limited, the ratio by weight is preferably 10/90 to 90/10, and more preferably 15/85 to 85/15. When the ratio by weight of the block copolymer (A) is low so that the ratio by weight of the thermoplastic resin (B) is excessively high, the resultant composition tends to have high hardness and poor flexibility. When the ratio by weight of the block copolymer (A) is high so that the ratio by weight of the thermoplastic resin (B) is excessively low, the effect of improving mechanical strength and heat resistance tends to decrease.

A method for compounding the block copolymer (A) and the thermoplastic resin (B) comprises adding the thermoplastic resin (B) to the block copolymer (A) to improve the physical properties such as the mechanical properties and hardness. Another method comprises adding the block copolymer (A) functioning as a softening agent to the thermoplastic resin to improve hardness while maintaining the mechanical strength of the thermoplastic resin (B).

In addition to the simple compounding of the block copolymer (A) and the thermoplastic resin (B) for producing a composition, a dynamic treatment (dynamic vulcanization) may be performed during mixing of the block copolymer (A) and the thermoplastic resin (B), for imparting the physical properties at high temperatures and more satisfactory compression set to the resultant composition.

The dynamic vulcanization is the technique developed by W. M. Fischer and others of Uniroyal Corp. and A. Y. Coran and others of Monsanto Corp. This is a process in which a rubber is blended with a thermoplastic resin matrix, and then highly vulcanized with a crosslinking agent, and finely dispersed under kneading at a temperature higher than the vulcanization temperature of the crosslinking agent. The composition produced by the dynamic vulcanization is in a state in which a discontinuous phase of the vulcanized rubber is finely dispersed in a continuous phase of the thermoplastic resin. Therefore, the composition exhibits physical properties similar to that of the crosslinked rubber, and permits forming according to a forming method for the thermoplastic resin.

In the present invention, the dynamic vulcanization method is not limited, but a method utilizing ester exchange, or a method utilizing intramolecular unsaturated double bonds may be used.

In the present invention, the molecular weight and structure of the block copolymer (A) are controlled to easily achieve more preferred physical properties.

Specifically, the block copolymer (A) of the present invention contains the (meth)acrylic polymer block (a), and thus has the tendency that the compatibility with the thermoplastic resin can be easily improved, and that the mechanical strength can be easily improved by reinforcement of the vulcanazed structure. In production by controlled polymerization, the introduction site of a crosslinkable functional group can easily be controlled, and thus the molecular weight between crosslinks, which affects the mechanical strength and elongation of the resultant composition, tends to be easily controlled. For example, a crosslinkable functional group is introduced into the acrylic polymer block (b) to form crosslinks, furthermore the compatibility with the thermoplastic resin (B) can be improved with the (meth)acrylic polymer block (a), or the mechanical strength can be improved by reinforcement. Also, crosslinks are formed in the (meth)acrylic polymer block (a) to secure the intended molecular weight between crosslinks, furthermore the compatibility with the thermoplastic resin (B) can be improved. The introduction site and crosslinking method of the crosslinkable functional group are properly selected according to the type of the thermoplastic resin used, and the required physical properties of the resultant composition.

In the present invention, the dynamic vulcanization method is not particularly limited, and the method utilizing ester exchange, or the method utilizing intramolecular unsaturated double bonds can be used. For example, the block copolymer (A) of the present invention is a (meth)acrylic polymer, and thus the dynamic vulcanization can be performed by ester exchange reaction.

Although not particularly limited, when the block copolymer (A) having a hydroxyl group is used, the dynamic vulcanization can be performed by a method comprising mixing the block copolymer (A) with the thermoplastic resin (B), adding an ester exchange catalyst under melt kneading to produce an alcohol component by ester exchange reaction, then evaporating or removing the alcohol component to promote a vulcanization reaction.

When the block copolymer (A) not having a hydroxyl group is used, the dynamic vulcanization can be performed by the same ester exchange reaction as that for the block copolymer (A) having a hydroxyl group except that a hydroxyl-containing compound with divalency or higher valency is used as the crosslinking agent. As a result, a soft material for automobile comprising the vulcanized block copolymer (A) can be produced.

A preferred method for introducing a hydroxyl group into the block copolymer (A) comprises direct polymerization of a monomer having a hydroxyl group. Preferred examples of the monomer having a hydroxyl group include 2-hydroxyethyl methacrylate, 2-hydroxypropyl methacrylate, 4-hydroxybutyl methacrylate, 2-hydroxyethyl acrylate, 2-hydroxypropyl acrylate, and 4-hydroxybutyl acrylate. From the viewpoint of cost and availability, 2-hydroxyethyl methacrylate and 2-hydroxyethyl acrylate are more preferred.

As the (meth)acrylic ester monomer constituting the block copolymer (A), any of the above-described examples of the methacrylic ester constituting the (meth)acrylic polymer block (a) can be used. The methacrylic esters can be used alone or in a combination of two or more. In particular, a (meth)acrylic ester monomer which produces an alcohol having a boiling point of 200° C. or less, preferably 150° C. or less, is preferred because the alcohol component produced by ester exchange is evaporated or removed to promote vulcanization. Among these methacrylic esters, methyl methacrylate and tert-butyl methacrylate are preferred from the viewpoint of compatibility with the thermoplastic resin (B) used, availability, and ester exchange reactivity. As the acrylic ester monomer constituting the block copolymer (A), any of the above-described examples of the acrylic ester constituting the acrylic polymer block (b) can be used. The acrylic esters can be used alone or in a combination of two or more. In particular, an acrylic ester monomer which produces an alcohol having a boiling point of 200° C. or less, preferably 150° C. or less, is preferred because the alcohol component produced by ester exchange is evaporated or removed to promote vulcanization. Among these acrylic esters, ethyl acrylate, 2-methoxyethyl acrylate, n-butyl acrylate, and tert-butyl acrylate are preferred from the viewpoint of the rubber elasticity of the resultant vulcanized product, availability, and ester exchange reactivity.

A monomer having high ester exchange reactivity can be used as a constituent monomer of the block copolymer (A), and polymerized to be contained in the block copolymer (A), thereby permitting selective vulcanization by utilizing a difference between the reaction rates of ester exchange reaction.

In the dynamic vulcanization, the amount of the thermoplastic resin compounded is preferably 5 parts by weight to 150 parts by weight, and more preferably 10 parts by weight to 100 parts by weight, based on 100 parts by weight of the (meth)acrylic polymer (A). When the amount of the thermoplastic resin compounded is more than 150 parts by weight, the compression set and rubber elasticity of the resultant thermoplastic elastomer tend to deteriorate. When the amount of the thermoplastic resin compounded is less than 5 parts by weight, the processability and mechanical strength of the resultant thermoplastic elastomer tend to decrease. In the dynamic vulcanization by ester exchange reaction, it is preferable to use a thermoplastic resin having substantially no ester exchange reactivity with a compound having a hydroxyl group in the presence of the ester exchange catalyst from the viewpoint of compression set and rubber elasticity.

In order to produce a polyester such as poly(ethylene terephthalate), poly(butylene terephthalate), or unsaturated polyester, a polymerization catalyst or ester exchange catalyst usually used in this industrial field may be used as the ester exchange catalyst. The catalyst is not particularly limited. Examples of the catalyst include alkali earth metal hydroxides such as lithium hydroxide and calcium hydroxide; alkali earth metal salts, quaternary ammonium salts, and alkali metal salts of boron and aluminum hydrides such as lithium aluminum hydride, sodium borohydride, and tetramethylammonium borohydride; alkali metal and alkali earth metal hydrides such as lithium hydride and calcium hydride; alkali metal and alkali earth metal alkoxides such as lithium methoxide and calcium methoxide; alkali metal and alkali earth metal aryloxides such as lithium phenoxide, magnesium phenoxide, and NaO—Ar—ONa (Ar is an aryl group); alkali metal and alkali earth metal organic acid salts such as calcium acetate and sodium benzoate; zinc compounds such as zinc oxide and zinc phenoxide; boron compounds such as boron oxide, boric acid, sodium borate, trimethyl borate, tributyl borate, and triphenyl borate; silicon compounds such as silicon oxide, sodium silicate, tetraalkyl silane, and tetraaryl silane; germanium compounds such as germanium oxide, germanium tetrachloride, and germanium ethoxide; tin oxide; organotin compounds, for example, dialkyltin oxide, dialkyltin carboxylate, and tin compounds having alkoxy groups or aryloxy groups such as ethyltin tributoxide; lead compounds such as lead oxide, lead acetate, lead carbonate, basic lead carbonate, alkoxides of lead or organolead, and aryloxides of lead or organolead; onium compounds such as quaternary ammonium salts, quaternary phosphonium salts, quaternary arsonium salts; antimony compounds such as antimony oxide; manganese compounds such as manganese acetate; titanium compounds such as titanium oxide and titanium alkoxides; and zirconium compounds such as zirconium acetate, zirconium alkoxides, and zirconium acetylacetone. These catalysts can be used alone or in a combination of two or more. Among these compounds, the titanium compounds, the tin compounds, the antimony compounds, the zirconium compounds, and the zinc compounds are preferred from the viewpoint of reactivity, and the titanium compounds are more preferred from the viewpoint of control of reactivity.

The amount of the catalyst used may be appropriately determined. For example, the amount of the catalyst is preferably 0.00001 to 0.01 part, and more preferably 0.00005 to 0.001 part, based on the amount of the (meth)acrylic polymer (A).

The hydroxyl-containing compounds with divalency or higher valency are not particularly limited. Examples of such compounds include divalent hydroxyl-containing compounds such as ethylene glycol, 1,3-propanediol, and triethylene glycol; trivalent hydroxyl-containing compounds such as 1,2,6-trihexanetriol and glycerin; tetravalent hydroxyl-containing compounds such as pentaerythritol and diglycerin; polyvalent hydroxyl-containing compounds such as sorbitol, polyglycerin, and polyvinyl alcohol. Among these compounds, aliphatic compounds having a boiling point of at least 100° C. are preferred, and aliphatic compounds having a boiling point of at least 150° C. are more preferred from the viewpoint of handling in reaction and availability. From the viewpoint of ester exchange reactivity, secondary alcohols are preferred, and primary alcohols are more preferred. Furthermore, compounds having excellent compatibility with the (meth)acrylic polymer (A) are preferably used. These compounds can be used alone or in a combination of two or more. The valency of the hydroxyl group used may be properly selected from the viewpoint of balance between the hardness and mechanical properties of the resulting soft material for automobile.

The hydroxyl-containing compound may be properly determined according to balance between the hardness and mechanical properties, and compression set of the resulting soft material for automobile. For example, the amount of the hydroxyl-containing compound is preferably 0.1 to 200 parts by weight, and more preferably 1.0 to 150 parts by weight, based on 100 parts by weight of the (meth)acrylic polymer (A). When the amount of the hydroxyl-containing compound compounded exceeds 200 parts by weight, the balance between the hardness and mechanical strength of the resultant composition tends to be lost.

In order to produce the soft material for automobile of the present invention, a phosphorus compound is preferably used along with the ester exchange catalyst for further improving the heat resistance of the resulting thermoplastic elastomer composition, inactivating the catalyst used in the ester exchange reaction and improving the compression set of the resulting thermoplastic elastomer composition. Although the phosphorus compound is not particularly limited, for example, phosphoric acid, phosphorous acid, hypophosphorous acid, pyrophosphoric acid, polyphosphoric acid, a phosphoric ester, or a phosphorous ester may be used as the phosphorus compound. These phosphorus compounds may be used alone or in a combination of two or more. Among these phosphorus compounds, a phosphorous ester is preferred from the viewpoint of heat resistance of the resultant thermoplastic elastomer composition.

The phosphorus compound is added for inactivating the catalyst used in the ester exchange reaction, and it can be added in any desired stage. However, the phosphorus compound is preferably added in the stage in which the ester exchange reaction is substantially completed or any subsequent stage.

In the dynamic vulcanization method utilizing intramolecular unsaturated double bonds, the block copolymer (A) having intramolecular unsaturated double bonds and the thermoplastic resin (B) are compounded, and then dynamically treated with a general rubber crosslinking agent to valcanize the block copolymer (A). In this method, the block copolymer (A) must have unsaturated double bonds in its main chain or side chains. Although the method for introducing unsaturated double bonds into the block copolymer (A) is not particularly limited, the unsaturated double bonds can be introduced by copolymerization of a compound having both a polymerizable alkenyl group and at least another alkenyl group during polymerization for the block copolymer (A), or by modifying the block copolymer (A) with a compound having an unsaturated double bond.

The compound having both a polymerizable alkenyl group and at least one other alkenyl group is not particularly limited. Examples of such a compound include compounds represented by the following formulae (1) and (2):

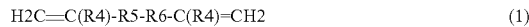

(wherein R4s are each a hydrogen atom or a methyl group, and may be the same or different; R5 is —C(O)O— (ester group) or o-, m-, or p-phenylene group; and R6 is a direct bond or a divalent organic group having 1 to 20 carbon atoms which may have at least one ether bond); and

(wherein R7 and R9 are each a hydrogen atom or a methyl group, and may be the same or different, R8 is a direct bond or a divalent organic group having 1 to 20 carbon atoms which may have at least one ether bond).

Examples of the R6 in formula (1) include alkylene groups such as methylene, ethylene, and propylene; o-, m-, and p-phenylene groups; aralkyl groups such as a benzyl group; and alkylene groups containing an ether bond, such as —CH2CH2-O—CH2- and —O—CH2-.

Among the compounds represented by formulae (1) and (2), the following compounds are preferred in view of availability and ease of polymerization control:

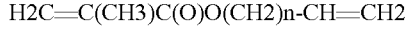

(wherein n is an integer of 0 to 20);

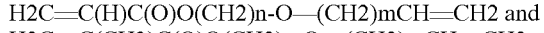
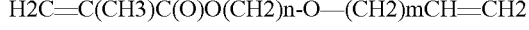

(wherein n is an integer of 1 to 20, and m is an integer of 0 to 20); and o-, m-, p-divinylbenzene,
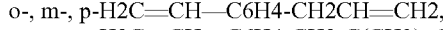
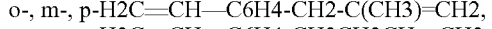
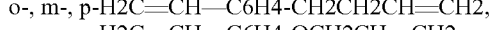
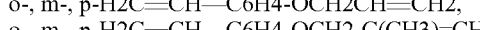
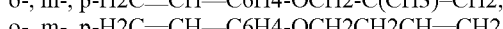
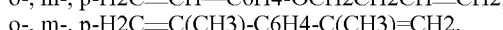
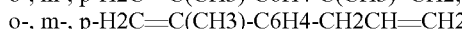
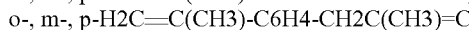
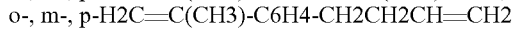
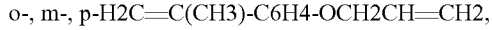
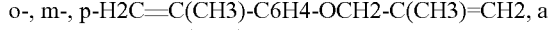
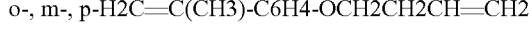

The following compounds are more preferred:
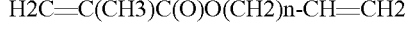

(wherein n is an integer of 0 to 20).

The method of modifying the block copolymer (A) with a compound having an unsaturated double bond is not particularly limited. For example, an unsaturated double bond can be introduced by ester exchange reaction between the (meth)acrylic ester of the block copolymer (A) and a compound having an unsaturated double bond and a hydroxyl group in its molecule, such as allyl alcohol.

The unsaturated double bond may be contained in both or one of the (meth)acrylic polymer block (a) and the acrylic polymer block (b), but the unsaturated double bond is preferably contained in one of the (meth)acrylic polymer block (a) and the acrylic polymer block (b) from the viewpoint of compatibility with the thermoplastic resin (B) and the physical properties of the resulting composition.

For example, the unsaturated double bond is introduced into the acrylic polymer block (b) for forming crosslinks, furthermore compatibility with the thermoplastic resin (B) can be improved by the (meth)acrylic polymer block (a), and the mechanical strength can be improved by reinforcement. Alternatively, the unsaturated double bond is introduced into the (meth)acrylic polymer block (a) to secure the intended molecular weight between crosslinks, furthermore compatibility with the thermoplastic resin (B) can be improved.

As the crosslinking agent, a general rubber crosslinking agent (crosslinking agent) can be used. Examples of the crosslinking agent include sulfur-based crosslinking agents such as powdery sulfur, precipitated sulfur, highly dispersible sulfur, surface-treated sulfur, insoluble sulfur, dimorpholine disulfide, and alkylphenol disulfide. Examples of an organic peroxide crosslinking agent include benzoyl peroxide, tert-butyl hydroperoxide, 2,4-dichlorobenzoyl peroxide, 2,5-dimethyl-2,5-di(tert-butylperoxy)hexane, and 2,5-dimethyl-hexane-2,5-di(peroxylbenzoate).

When the organic peroxide crosslinking agent is used, a polyfunctional vinyl monomer such as divinylbenzene, or a polyfunctional methacrylate monomer such as ethylene glycol dimethacrylate or diethylene glycol dimethacrylate may be added as a vulcanization auxiliary agent according to demand. With the vulcanization auxiliary agent, homogeneous and effective vulcanization can be expected.

If required, a vulcanization accelerator may be added. As the vulcanization accelerator, a general vulcanization accelerator such as an aldehyde-ammonia type, a guanidine type, a thiazole type, a sulphenamide type, a thiuram type, a dithioic salt type, or a thiourea type may be used. A general auxiliary agent for rubber can also be used as an auxiliary agent of vulcanization accelerator. For example, zinc white, stearic acid, oleic acid, or any of Zn salts thereof may be used as the auxiliary agent of vulcanization accelerator.

In the present invention, the required crosslinking agent may be properly selected according to the dynamic crosslinking conditions (temperature and time), and the physical properties of the resulting thermoplastic elastomer. When the resulting thermoplastic elastomer is required to have heat resistance, the organic peroxide crosslinking agent is preferably used.

The polymer composition constituting the soft material for automobile of the present invention may contain at least one additive in addition to the block copolymer (A) according to demand, for controlling the physical properties within a range which causes no decrease in the effect of the present invention. Examples of the additive other than the thermoplastic resin (B) include other rubber polymers (C), a tackifiler (D), a stabilizer (E), a flexibilizer (F), a lubricant (G), a flame retardant (H), a pigment (I), a filler (J), a release agent (K), an antistatic agent (L), and an antibacterial-antifungal agent (M). These additives may be properly selected according to the purpose of use of the soft material for automobile.

Examples of other rubber polymers (C) include compounds such as styrene-butadiene rubber (SBR), butadiene rubber (BR), isoprene rubber (IR), ethylene-propylene copolymer rubber (EPM), ethylene-propylene-diene copolymer rubber (EPDM), acrylonitrile-butadiene copolymer rubber (NBR), chloroprene rubber, butyl rubber (IIR), urethane rubber, silicone rubber, polysulfide rubber, hydroxynitrile rubber, fluororubber, tetrafluoroethylene-propylene rubber, tetrafluoroethylene-propylene-vinylidene fluoride rubber, acrylic rubber (ACM), chlorosulfonated polyethylene rubber, epichlorohydrin rubber (CO), ethylene acrylic rubber, and norbornene rubber. However, the rubber polymer (C) is not limited to these compounds. These compounds may be used alone or in a combination of two or more.

Examples of the tackifiler (D) include compounds such as TACKROL 101 (produced by Taoka Chemical Co., Ltd.), HITANOL 1501 (produced by Hitachi Chemical Co., Ltd.), phenolic resins, modified phenolic resins, modified alkylphenol-formaldehyde resins, cyclopentadiene-phenol resins, xylene resins, cumarone resins, petroleum resins, terpene resins, terpene phenol resins, rosin ester resins, and HITANOL 5501 (produced by Hitachi Chemical Co., Ltd.). However, the tackifiler is not limited to these compounds. The compounds may be used alone or in a combination of two or more.

Although examples of the stabilizer (E) include compounds such as triphenyl phosphite, hindered phenols, and dibutyltin maleate, the stabilizer (E) is not limited to these compounds. These compounds may be used alone or in a combination of two or more.

Examples of the flexibilizer (F) include compounds such as plasticizers normally added to thermoplastic resins and rubber; softening agents such as process oil; oligomers; oils such as animal oil and vegetable oil; petroleum fractions such as kerosene, light oil, heavy oil, and naphtha. However, the flexibilizer (F) is not limited to these compounds. Examples of the softening agent include process oil, specifically petroleum process oil such as paraffinic oil, naphthenic process oil, and aromatic process oil. Examples of the plasticizer include phthalic acid derivatives such as dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, and butylbenzyl phthalate, dicyclohexyl phthalate; isophthalic acid derivatives such as dimethyl isophthalate; tetrahydrophthalic acid derivatives such as di-(2-ethylhexyl) tetrahydrophthalate; adipic acid derivatives such as dimethyl adipate, dibutyl adipate, di-n-hexyl adipate, di-(2-ethylhexyl) adipate, isononyl adipate, diisodecyl adipate, and dibutyl diglycol adipate; azelaic acid derivatives such as di-2-ethylhexyl azelate; sebacic acid derivatives such as dibutyl sebacate; dodecane-2-acid derivatives; maleic acid derivatives such as dibutyl maleate and di-2-ethylhexyl maleate; fumaric acid derivatives such as dibutyl fumarate; p-oxybenzoic acid derivatives such as 2-ethylhexyl p-oxybenzoate; trimellitic acid derivatives such as tris-2-ethylhexyl trimellitate; pyromellitic acid derivatives; citric acid derivatives such as acetyl-tributyl citrate; itaconic acid derivatives; oleic acid derivatives; ricinoleic acid derivatives; stearic acid derivatives; other fatty acid derivatives; sulfonic acid derivatives; phosphoric acid derivatives; glutaric acid derivatives; polyester plasticizers composed of a polymer of a dibasic acid such as adipic acid, azelaic acid, or phthalic acid with a glycol and a monohydric alcohol; glycol derivatives, glycerin derivatives; paraffin derivatives such as chlorinated paraffin; epoxy derivative; polyester polymeric plasticizers; polyether polymeric plasticizers; carbonate derivatives such as ethylene carbonate and propylene carbonate; sulfonamide derivatives such as N-butylbenzene sulfonamide, N-ethyltoluene sulfonamide, and N-cyclohexyltoluene sulfonamide; and vinyl polymers such as acrylic plasticizers produced by various methods for polymerizing vinyl monomers. In the present invention, the plasticizer is not limited to these compounds, and any one of various plasticizers can be used. Commercially available plasticizers widely used for rubber or thermoplastic resins can also be used. Examples of commercially available plasticizers include Thiokol TP (produced by Morton Co., Ltd.), Adekacizers O-130P, C-79, UL-100, P-200, and RS-735 (produced by Asahi Denka Kogyo K.K.), Sansocizer N-400 (produced by New Japan Chemical Co., Ltd.), BM-4 (produced by Daihachi Chemical Industry Co., Ltd.), EHPB (produced by Ueno Seiyaku K.K.), and UP-1000 (produced by Toagosei Co., Ltd.). Examples of vegetable oils include castor oil, cottonseed oil, linseed oil, rapeseed oil, soybean oil, palm oil, coconut oil, peanut oil, pine oil, and tall oil.

Among these plasticizers, a plasticizer having excellent affinity for the block copolymer (A) is preferably used. Although not particularly limited, plasticizers having low volatility and a small heating loss is more preferably used. Examples of such plasticizers include adipic acid derivatives, phthalic acid derivatives, glutaric acid derivatives, trimellitic acid derivatives, pyromellitic acid derivatives, polyester plasticizers, glycerin derivatives, epoxy derivative, polyester polymeric plasticizers, polyether polymeric plasticizers, and polymeric plasticizers, for example vinyl polymers such as acrylic plasticizers produced by various methods for polymerizing vinyl monomers. These flexibilizers may be used alone or in a combination of two or more.

Although the amount of the plasticizer used is not limited, the amount is preferably 5 to 300 parts by weight, more preferably 10 to 200 parts by weight, and most preferably 20 to 150 parts by weight, based on 100 parts by weight of the block copolymer (A). When the amount of the plasticizer is less than 5 parts by weight, the effect of the plasticizer is not recognized. When the amount exceeds 300 parts by weight, the resulting composition has low mechanical strength.

Examples of the lubricant (G) include compounds such as polyethylene wax, polypropylene wax, and montanic wax. However, the lubricant (G) is not limited to these compounds, and these lubricants may be used alone or in a combination of two or more.

Example of the flame retardant (H) include compounds such as triphenyl phosphate, tricresyl phosphate, decabromobiphenyl, decabromobiphenyl ether, and antimony trioxide. However, the flame retardant (H) is not limited to these compounds, and these compounds may be used alone or in a combination of two or more.

Examples of the pigment (I) include compounds such as titanium oxide, zinc sulfide, and zinc oxide. However, the pigment (I) is not limited to these compounds, and these compounds may be used alone or in a combination of two or more.

Examples of the filler (J) include compounds such as carbon black, glass fiber, metal fiber, potassium titanate whisker, asbestos, wollastonite, mica, talc, calcium carbonate, glass flake, milled fiber, and metal powder. However, the filler (J) is not limited to these compounds, and these compounds may be used alone or in a combination of two or more.

When a polymer composition is used for producing the soft material for automobile of the present invention, the method for compounding the polymer composition and producing the soft material is not particularly limited. A known usable method comprises mechanically mixing raw materials by a known apparatus such as a Banbury mixer, a roll mill, a single-screw extruder, a twin-screw extruder, or a kneader, and then pelletizing the resulting mixture. The kneading temperature is preferably controlled according to the melting temperature and the like of the block copolymer (A) used. For example, the soft material can be produced by melt-kneading at 130 to 300° C.

In the above-described dynamic processing, various apparatuses permitting heating and kneading simultaneously can be used. Examples of the apparatuses include a Banbury mixer, a kneader, a single-screw extruder, and a multi-screw extruder, which are ordinarily used for rubber processing.

The soft material for automobile can be formed by molding the polymer composition using any desired molding method such as extrusion, compression molding, blow molding, calendering, vacuum forming, injection molding, foaming, powder slush molding, or injection blowing. The soft material for automobile is preferably formed by injection molding from the viewpoint of forming simplicity. A hollow molded product having a uniform thickness can be produced by injection molding. For a molding for automobile, an exterior member for automobile is preferably formed by contour extrusion from the viewpoint of forming simplicity.

The soft material for automobile of the present invention can be used for interior members of automobile such as skins (switch skins, instrument panel skins, crash pad skins, door trim skins, dashboard skins, sheet skins, headrest skins, armrest skins, steering wheel covers, and air bag outer covers), shift lever knobs, sheet cushions, arm rests, head rests, assist grips, switches, door trims, ceiling materials, center pillar covers, rear partitions, welt body sides, dash panel pads, side protectors, sun visor materials, front sheets, back panels, rearview mirror frames, floor mats, composite materials for doors, sheet rails, instrument panels, glove compartments, console boxes, pads, sound-proof materials, and vibration-proof materials; and exterior members for automobile such as glass runs, window moldings, side moldings, trunk seals, glass channels, wiper blades, weather strips, washer hoses, soft tops, water-proof films, slide rails, door seaming welts, engine covers, oil seals, O-rings, gaskets, sound-proof materials, and vibration-proof materials.

Since the soft material for automobile of the present invention has excellent formability, the soft material can be applied to two-color injection molding using any type of various base materials. As the base material for two-color injection molding of the soft material for automobile, conventional various base materials composed of thermoplastic resins can be used. In particular, for an inner layer material for automobile, poly (vinyl chloride), polypropylene, poly(ethylene terephthalate), or polyacetal is often used from the viewpoint of processability and cost. Other base materials such as thermosetting resins, steel sheets, wood, paper, and leather can also be used bonding with an adhesive agent because these materials have excellent adhesiveness.

Also, the soft material for automobile of the present invention has high flexibility, excellent formability and excellent fundamental mechanical properties. Consequently, the soft material for automobile can be used as a new hollow molded product material for automobile which is improved with respect to the disadvantages of conventional materials such as chloroprene and thermoplastic polyester elastomers.

Examples of the hollow molded products for automobile include hollow molded boots for automobile such as a constant velocity joint boot, a strut boot, a rack and pinion boot, a brake booster boot, a steering ball joint boot, and a suspension ball joint boot; and hollow molded hoses for automobile, such as a washer hose, an air intake hose, an ABS hose, an air brake hose, an oil suspension hose, an oil cooler hose, an ATS hose, a brake hose, a power steering hose, a car air conditioning hose, and a vacuum brake hose.

Although the present invention will be described in further detail below with reference to examples, the present invention is not limited to these examples.

In the examples, EA, BA, MEA, MMA, TBMA, HEMA, and HEA represent ethyl acrylate, n-butyl acrylate, 2-methoxyethyl acrylate, methyl methacrylate, tert-butyl methacrylate, 2-hydroxyethyl methacrylate, and 2-hydroxyethyl acrylate, respectively.

<Measurement Methods>

(Molecular Weight)

The molecular weight of the block copolymer was measured by a GPC analyzer (system: GPC system produced by Waters Corporation, column: Shodex K-804 (polystyrene gel) produced by Showa Denko K.K.). The molecular weight was determined in terms of polystyrene using chloroform as a eluent.

(Analysis of Acid Conversion)

A decomposition reaction of the block copolymer into carboxyl groups was confirmed by infrared spectroscopy (using FTIR-8100 produced by Shimadzu Corporation) and nuclear magnetic resonance analysis (using AM400 produced by BRUKER Corporation). With respect to the solvent for nuclear magnetic resonance analysis, a carboxylate ester structure block was analyzed by using deuterochloroform as the measurement solvent, and a carboxyl-containing block was analyzed using deuteromethanol as the measurement solvent.

(Thermogravimetric Analysis)

The thermal decomposition resistance of the block copolymer was measured by a thermal and differential thermogravimetric analyzer (DTG-50) (produced by SHIMADZU Corporation). Measurement was conducted at a heating rate of 10.0° C./min under a nitrogen stream at a flow rate of 50.0 n-l/min. The 5%-weight-loss temperature was measured by the thermogravimetric analysis based on the weight at 100° C.

(Hardness)

Hardness at 23° C. (initial value according to JIS A) was measured according to JIS K6253. However, when a hardness measured by a type A durometer exceeded 90, the hardness was measured by a type D durometer (JIS D).

(Mechanical Strength)

The tensile strength and elongation were measured with Autograph model AG-10TB produced by SHIMADZU Corporation according to the method described in JIS K7113. Measurement was conducted with n=3, and averages of strength (MPa) and elongation (%) at breakage of a test piece were determined. The test piece had a shape of No. 2(1/3) having a thickness of about 2 mm. Also, measurement was conducted at 23° C. and at a test rate of 500 mm/min. Before the measurement, the test piece was conditioned at a temperature of 23±2° C. and a relative humidity of 50±5% for 48 hours or more.

(Compression Set)

According to JIS K6301, a cylindrical molded sample was held at 70° C. for 22 hours at a compression rate of 25% and allowed to stand at room temperature for 30 minutes. Then, the thickness of the sample was measured to determine residual set. Namely, a compression set of 0% corresponds to complete recovery, and a compression set of 100% corresponds to no recovery.

<Block Copolymer>

EXAMPLE 1

Synthesis and Converting Functional Group of TBMA-b-BA-b-TBMA Block Copolymer (a)

The operation below was conducted for producing the TBMA-b-BA-b-TBMA block copolymer (a). After the air in a 2 L separable flask used as a polymerization reactor was replaced with nitrogen, 4.50 g (31.3 mmol) of copper bromide and 72 ml of acetonitrile (bubbled with nitrogen) were added to the flask. The resultant mixture was stirred under heating at 70° C. for 30 minutes, and then 2.26 g (6.28 mmol) of diethyl 2,5-dibromoadipate as the initiator and 360 ml (2.51 mol) of BA were added to the mixture. After stirring under heating at 85° C., 0.66 ml (3.14 mmol) of diethylenetriamine as a ligand was added to the resultant mixture to initiate polymerization.

After polymerization was initiated, about 0.2 ml of solution was sampled from the polymerization solution at predetermined time intervals, and each sampled solution was subjected to gas chromatographic analysis to determine the conversion rate of BA. The polymerization rate was controlled by adding the triamine as occasion demands. At a BA conversion rate of 95%, 243 ml (1.50 mmol) of TBMA, 3.11 g (31.3 mmol) of copper chloride, 0.66 ml (3.14 mmol) of diethylenetriamine, and 481 ml of toluene (bubbled with nitrogen) were added to the reaction solution. Similarly, the conversion rate of TBMA was determined. At a TBMA conversion rate of 67% and a BA conversion rate of 97%, 520 ml of toluene was added to the reaction solution, and the reactor was cooled in a water bath to terminate the reaction.

The reaction solution was diluted with 2.0 L of toluene, and 7.16 g of p-toluenesulfonic acid monohydrate was added to the mixture, followed by stirring at room temperature for 3 hours. The precipitate was filtered off with a Kiriyama funnel, and then 4.50 g of an adsorbent, Kyoward 500SH (produced by Kyowa Chemical K.K.) was added to the resultant polymer solution, followed by further stirring at room temperature for 3 hours. The adsorbent was filtered off with a Kiriyama funnel to obtain a colorless, transparent polymer solution. The solution was dried to remove the solvent and residual monomers and produce the target block copolymer (a).

The GPC analysis of the resultant block copolymer (a) showed a number-average molecular weight Mn of 95,500, and a molecular weight distribution Mw/Mn of 1.44.

One hundred grams of the resultant block copolymer (a) was dissolved in 1.0 L of toluene, and 3.0 g of p-toluenesulfonic acid monohydrate was added to the resulting solution. Then, the resultant mixture was stirred under heating in an oil bath at 120° C. for 3 hours to covert a tert-butyl ester segment to a carboxyl group. The reaction solution was diluted with methanol, and 2.0 g of Kyoward 500SH was added to the solution, followed by stirring. Then, the adsorbent was filtered off, and the residue was dried under vacuum at 80° C. to produce the target carboxyl-containing block copolymer (b). The conversion of a tert-butyl ester segment to a carboxyl group was confirmed by IR (infrared absorption spectrum) and $^{13}$C-NMR (nuclear magnetic resonance spectrum). Namely, the conversion could be confirmed by IR analysis in which a broad absorption spectrum due to a carboxyl group was observed at about 3400 to 3000 cm-1 after the conversion. Also, the conversion could be confirmed by $^{13}$C-NMR analysis in which signals at 82 ppm and 28 ppm due to quaternary carbon and methyl carbon, respectively, of a tert-butyl group disappeared after the conversion. The content of a carboxyl-containing monomer introduced in the resultant block copolymer (b) was 21.8% by weight. The content of the carboxyl-containing monomer introduced was calculated from the ratio of the monomer charged and the conversion rate because tert-butyl methacrylate was converted to methacrylic acid.

As a result of thermogravimetric analysis of the carboxyl-containing block copolymer (b), the 5%-weight-loss temperature was 313° C.

EXAMPLE 2

Synthesis and Functional Group Conversion of (MMA-co-TBMA)-b-BA-b-(MMA-co-TBMA) Block Copolymer (c)

In a 5 L separable flask, 5.65 g (15.7 mmol) of diethyl 2,5-dibromoadipate and 900 ml (6.28 mol) of BA were charged and subjected to polymerization. At a BA conversion rate of 95%, 234 ml (1.44 mol) of TBMA and 154 ml (1.44 mol) of MMA were added to the reaction solution. At a TBMA conversion rate of 89% and an MMA conversion rate of 84%, the reaction was terminated. Then, the same operation as that for producing the block copolymer (a) in Example 1 except for adjusting the amount of the catalyst was performed to produce the target block copolymer (c).

The GPC analysis of the resultant block copolymer (c) showed a number-average molecular weight Mn of 113,600, and a molecular weight distribution Mw/Mn of 1.44.

The functional groups of the block copolymer (c) were converted by the same method as in Example 1 to synthesize a carboxyl-containing block copolymer (d). As a result of thermogravimetric analysis of the carboxyl-containing block copolymer (d), the 5%-weight-loss temperature was 342° C. The content of the carboxyl-containing monomer introduced in the resultant block copolymer (d) was 14.7% by weight.

EXAMPLE 3

Synthesis and Functional Group Conversion of (MMA-co-TBMA)-b-(BA-co-EA-co-MEA)-b-(MMA-co-TBMA) Block Copolymer (e)

In a 5 L separable flask, 5.89 g (16.4 mmol) of diethyl 2,5-dibromoadipate, 362 ml (2.52 mol) of BA, 344 ml (3.17 mol) of EA, and 195 ml (1.51 mol) of MEA were charged and subjected to polymerization. At a BA conversion rate of 95%, an EA conversion rate of 95%, and an MEA conversion rate of 97%, 158 ml (0.97 mol) of TBMA and 418 ml (3.91 mol) of MMA were added to the reaction solution. At a TBMA conversion rate of 64%, and an MMA conversion rate of 59%, the reaction was terminated. Then, the same operation as that for producing the block copolymer (a) in Example 1 except for adjusting the amount of the catalyst was performed to produce the target block copolymer (e).

The GPC analysis of the resultant block copolymer (e) showed a number-average molecular weight Mn of 111,000, and a molecular weight distribution Mw/Mn of 1.47.

The functional groups of the block copolymer (e) were converted by the same method as in Example 1 to synthesize a carboxyl-containing block copolymer (f). As a result of thermogravimetric analysis of the carboxyl-containing block copolymer (f), the 5%-weight-loss temperature was 333° C. The content of the carboxyl-containing monomer introduced in the resultant block copolymer (f) was 4.93% by weight.

EXAMPLE 4

Synthesis and Functional Group Conversion of TBMA-b-(BA-co-EA-co-MEA)-b-TBMA Block Copolymer (g)

After the air in a 500 ml separable flask used as a polymerization reactor was replaced with nitrogen, 0.71 g (7.2 mmol) of copper chloride and 18 ml of acetonitrile (dried with molecular sieves and bubbled with nitrogen) were added to the flask. The resultant mixture was stirred at a temperature of 65° C. for 15 minutes, and then 36.2 ml (252 mmol) of BA, 34.4 ml (317 mmol) of EA, and 19.5 ml (151 mmol) of MEA were added to the mixture. After stirring under heating at 88° C., 0.15 ml (0.72 mmol) of diethylenetriamine as a ligand was added to the mixture. Then, 2 ml of an acetonitrile solution containing 0.52 g (1.4 mmol) of diethyl 2,5-dibromoadipate was added to initiate polymerization.

After polymerization was initiated, about 0.2 ml of solution was sampled from the polymerization solution at predetermined time intervals, and each sampled solution was subjected to gas chromatographic analysis to determine the conversion rates of BA, EA, and MEA. The polymerization rate was controlled by adding the triamine as occasion demands. At a BA conversion rate of 96%, an EA conversion rate of 96%, and an MEA conversion rate of 97%, 68.2 ml of toluene (dried with molecular sieves and bubbled with nitrogen), 23.4 ml (144 mmol) of TBMA, 0.71 g (7.2 mmol) of copper chloride, and 0.15 ml (0.72 mmol) of diethylenetriamine were added to the reaction solution. Similarly, the conversion rate of MMA was determined. At a BA conversion rate of 98%, an EA conversion rate of 98%, an MEA conversion rate of 99%, and a TBMA conversion rate of 93%, 150 ml of toluene was added to the reaction solution, and the reactor was cooled in a water bath to terminate the reaction. The reaction solution was filtered with activated alumina to remove a copper complex. The resultant polymer was dried under vacuum at 60° C. for 24 hours to produce the target block copolymer (g).

The GPC analysis of the resultant block copolymer (g) showed a number-average molecular weight Mn of 112,000, and a molecular weight distribution Mw/Mn of 1.35.

The functional groups of the block copolymer (g) were converted by the same method as in Example 1 to synthesize a carboxyl-containing block copolymer (h). The content of the carboxyl-containing monomer introduced in the resultant block copolymer (h) was 17.4% by weight.

EXAMPLE 5

Synthesis and Functional Group Conversion of (MMA-co-TBMA)-b-BA-b-(MMA-co-TBMA) Block Copolymer (i)

In a 5 L separable flask, 5.65 g (15.7 mmol) of diethyl 2,5-dibromoadipate and 900 ml (6.28 mol) of BA were charged and subjected to polymerization. At a BA conversion rate of 95%, 152 ml (0.94 mol) of TBMA and 400.9 ml (3.75 mol) of MMA were added to the reaction solution. At a TBMA conversion rate of 71% and an MMA conversion rate of 66%, the reaction was terminated. Then, the same operation as that in Example 1 except for adjusting the amount of the catalyst was performed to produce the target block copolymer (i). The GPC analysis of the resultant block copolymer (i) showed a number-average molecular weight Mn of 122,858, and a molecular weight distribution Mw/Mn of 1.46. The functional groups of the block copolymer (i) were converted by the same method as in Example 1 to synthesize a carboxyl-containing block copolymer 0). As a result of thermogravimetric analysis of the carboxyl-containing block copolymer (j), the 5%-weight-loss temperature was 319° C. The content of the carboxyl-containing monomer introduced in the resultant block copolymer (j) was 5.3% by weight.

EXAMPLE 6

Synthesis and Functional Group Conversion of (MMA-co-TBMA)-b-(BA-co-EA-co-MEA)-b-(MMA-co-TBMA) Block Copolymer (k)

In a 5 L separable flask, 5.89 g (16.4 mmol) of diethyl 2,5-dibromoadipate, 361 ml (2.52 mol) of BA, 344 ml (3.17 mol) of EA, and 195 ml (1.51 mol) of MEA were charged and subjected to polymerization. At a BA conversion rate of 96%, an EA conversion rate of 96%, and an MEA conversion rate of 98%, 83.2 ml (0.51 mol) of TBMA and 494 ml (4.62 mol) of MMA were added to the reaction solution. At a TBMA conversion rate of 66% and an MMA conversion rate of 63%, the reaction was terminated. Then, the same operation as that in Example 1 except for adjusting the amount of the catalyst was performed to produce the target block copolymer (k). The GPC analysis of the resultant block copolymer (k) showed a number-average molecular weight Mn of 119,378, and a molecular weight distribution Mw/Mn of 1.49. The functional groups of the block copolymer (k) were converted by the same method as in Example 1 to synthesize a carboxyl-containing block copolymer (l). As a result of thermogravimetric analysis of the carboxyl-containing block copolymer (l), the 5%-weight-loss temperature was 306° C. The content of the carboxyl-containing monomer introduced in the resultant block copolymer (l) was 2.6% by weight.

EXAMPLE 7

Synthesis and Functional Group Conversion of (MMA-co-TBMA)-b-(BA-co-EA-co-MEA)-b-(MMA-co-TBMA) Block Copolymer (m)

In a 5 L separable flask, 5.31 g (14.8 mmol) of diethyl 2,5-dibromoadipate, 281 ml (1.96 mol) of BA, 267 ml (2.47 mol) of EA, and 151 ml (1.18 mol) of MEA were charged and subjected to polymerization. At a BA conversion rate of 95%, an EA conversion rate of 95%, and an MEA conversion rate of 97%, 193 ml (1.19 mol) of TBMA and 509 ml (4.77 mol) of MMA were added to the reaction solution. At a TBMA conversion rate of 64% and an MMA conversion rate of 61%, the reaction was terminated. Then, the same operation as that in Example 1 except for adjusting the amount of the catalyst was performed to produce the target block copolymer (m). The GPC analysis of the resultant block copolymer (m) showed a number-average molecular weight Mn of 118,927, and a molecular weight distribution Mw/Mn of 1.49. The functional groups of the block copolymer (m) were converted by the same method as in Example 1 to synthesize a carboxyl-containing block copolymer (n). As a result of thermogravimetric analysis of the carboxyl-containing block copolymer (n), the 5%-weight-loss temperature was 313° C. The content of the carboxyl-containing monomer introduced in the resultant block copolymer (n) was 6.6% by weight.

COMPARATIVE EXAMPLE 1

Synthesis of MMA-b-BA-b-MMA Block Copolymer (o).

5.65 g (15.7 mmol) of diethyl 2,5-dibromoadipate and 900 ml (6.28 mol) of BA were charged and subjected to polymerization. At a BA conversion rate of 95%, 554 ml (5.18 mol) of MMA was continuously added to the reaction solution. At a BA conversion rate of 97% and an MMA conversion rate of 60%, the reaction was terminated. Then, the same operation as that for producing the block copolymer (a) in Example 1 except for adjusting the amount of the catalyst was performed to produce the target block copolymer (o).

The GPC analysis of the resultant block copolymer (o) showed a number-average molecular weight Mn of 119,200, and a molecular weight distribution Mw/Mn of 1.51. The thermogravimetric analysis of the block copolymer (o) having no functional group (c) which has high strong cohesive force showed a 5%-weight-loss temperature was 280° C.

COMPARATIVE EXAMPLE 2

Synthesis of MMA-b-(BA-co-EA-co-MEA)-b-MMA Block Copolymer (p)

6.18 g (17.2 mmol) of diethyl 2,5-dibromoadipate and 12.3 g (85.8 mmol) of copper bromide were charged and subjected to polymerization for producing a BA-co-EA-co-MEA block. At a BA conversion rate of 95%, an EA conversion rate of 95%, and an MEA conversion rate of 96%, 575 ml (5.41 mol) of MMA was continuously added to the reaction solution. Then, the same operation as in Example 3 was performed. At an MMA conversion rate of 60%, the reaction was terminated.

The GPC analysis of the resultant block copolymer (p) showed a number-average molecular weight Mn of 119,000, and a molecular weight distribution Mw/Mn of 1.46.

Table 1 shows the test results of the mechanical strength, hardness, compression set, and 5%-weight-loss temperature of the block copolymer produced in each of the examples and the comparative examples.

TABLE 1

| Example | Resin | Breaking strength (MPa) | Breaking elongation (%) | Hardness (JIS-A) | Compression set (%) | 5%-weight-loss temperature (° C.) |
|---|---|---|---|---|---|---|
| 1 | b | 3.6 | 206 | 15 | 23 | 313 |
| 2 | d | 5.5 | 336 | 20 | 34 | 342 |
| 3 | f | 9.2 | 570 | 25 | 38 | 333 |
| 4 | h | 7.5 | 392 | 23 | 39 | 315 |
| 5 | j | 8.2 | 351 | 22 | 31 | 319 |
| 6 | l | 8 | 622 | 30 | 64 | 306 |
| 7 | n | 11.7 | 332 | 47 | | 313 |
| Comparative example 1 | o | 8.6 | 339 | 22 | 49 | 280 |
| Comparative example 2 | p | 6.6 | 621 | 22 | 76 | 287 |

In each of the examples, the carboxyl-containing block copolymer was synthesized. In each of Examples 1 to 7, the carboxyl-containing block copolymer (A) could be synthesized, and the introduction of functional groups exhibited the effect of significantly improving the thermal decomposition resistance. In Comparative Examples 1 and 2, it is found that the block copolymer having no function group such as a carboxyl group has remarkably low thermal decomposition resistance in comparison with the block copolymers of Examples 1 to 7. In Examples 1 to 5, it is found that the carboxyl-containing block copolymer (A) has low compression set at high temperatures and maintains strength necessary for forming, as compared with the block copolymer having no functional group such as a carboxyl group. It is also found that the hardness is not substantially changed even by introducing the functional group while the cohesive force is increased, and the carboxyl-containing block copolymer has low hardness, low compression set, and high mechanical strength.

PRODUCTION EXAMPLE 1

Synthesis of MMA-b-BA-b-MMA Block Copolymer (Ratio MMA/BA=3/7)

In 50 L reactor, 112.56 g of cuprous bromide was charged, and the air in the reactor was replaced with nitrogen. Then, a solution containing 627.44 g of acetonitrile and 1,072.8 g of n-butyl acrylate was charged in the reactor under reduced pressure, and the resultant mixture was heated to 65° C. and stirred for 30 minutes. Then, a solution containing 56.50 g of diethyl 2,5-dibromoadipate, 6973.2 g of n-butyl acrylate, and 158.76 g of butyl acetate, and 784.30 g of acetonitrile were charged in the reactor. The resultant mixture was further stirred for 30 minutes under heating to 85° C. 16 ml of pentamethyldiethylenetriamine was added to the reactor to initiate polymerization of n-butyl acrylate for a first block. When the conversion rate reached 95%, 14,228.8 g of toluene, 77.68 g of cuprous chloride, and 5182.5 g of methyl methacrylate were charged in the reactor, and 16 ml of pentamethyldiethylenetriamine was added to initiate polymerization of methyl methacrylate for a second block. When the conversion rate reached 56%, 8,660 g of toluene was added to dilute the reaction solution, and the reactor was cooled to terminate the polymerization.

The GPC analysis of the resultant block copolymer showed a number-average molecular weight Mn of 107,000, and a molecular weight distribution Mw/Mn of 1.46. Also, the NMR analysis of the composition showed MMA/BA=29/71 (% by weight).

Toluene was added to the resultant block copolymer solution so that the polymer concentration was 14.6% by weight, and 32 g of p-toluenesulfonic acid was further added to the solution. Then, the air in the reactor was replaced with nitrogen, followed by stirring at room temperature for 3 hours. After a solution sampled from the reaction solution was confirmed to be colorless and transparent, the reaction was terminated. Then, the solution was poured out of the reactor, and the solid content was removed with a disk centrifuge. Then, 150 g of Kyoward 500SH was added to 50 L of the block copolymer solution, and the air in the reactor was replaced with nitrogen, followed by stirring at room temperature for 3 hours. After a solution sampled from the reaction solution was confirmed to be neutral, the reaction was terminated. Then, the solution was poured out of the reactor, and the adsorbent was removed by solid-liquid separation.

The polymer solution was supplied to a horizontal evaporator with bent for removing the solvent and unreacted monomers to isolate a polymer. The temperatures of the body jacket and the screw of the evaporator were controlled to 200° C. by a heating medium, and the inside of the evaporator was kept in vacuum at about 0.01 MPa or less using a vacuum pump. The resultant resin was pelletized by an underwater pelletizing system. The extruder used was a single-screw type and had a screw diameter of 50 mm, and extrusion was preformed at 160° C. and a resin feed rate of 12 kg/hr. The die used had two holes of 2.4 mm in diameter and a 4-blade cutter. 0.3% by weight of stearic acid amide was added to circulation cooling water, and the flow rate of circulation cooling water was 260 L/min. The outlet of a heat exchanger was set to a temperature of 34° C. Consequently, spherical pellets (A-1) of about 3 mm in diameter were produced by the apparatus.

PRODUCTION EXAMPLE 2

Synthesis of MMA-b-(BA-co-EA-co-MEA)-b-MMA Block Polymer (MMA/(BA, EA, MEA)=6/4)

After the air in a 2000 ml separable flask used as a polymerization reactor was replaced with nitrogen, 4.60 g (32.0 mmol) of copper bromide and 40 ml of acetonitrile (dried with molecular sieves and bubbled with nitrogen) were added to the flask. The resultant mixture was stirred under heating at 70° C. for 5 minutes and then cooled to room temperature. Then, 2.31 g (6.4 mmol) of diethyl 2,5-dibromoadipate as the initiator, 80.4 ml (561 mmol) of BA, 76.4 ml (705 mmol) of EA, and 43.3 ml (336 mmol) of MEA were added to the mixture. After stirring under heating at 80° C., 0.67 ml (3.2 mmol) of diethylenetriamine as a ligand was as added to the resultant mixture to initiate polymerization.

After polymerization was initiated, about 0.2 ml of a solution was sampled from the polymerization solution at predetermined time intervals, and each sampled solution was subjected to gas chromatographic analysis to determine the conversion rate of each of BA, EA, and MEA. The polymerization rate was controlled by adding the triamine as occasion demands. At a BA conversion rate of 96%, an EA conversion rate of 95%, and an MEA conversion rate of 85%, 302 ml (2819 mmol) of MMA, 3.17 g (32.0 mmol) of copper chloride, 0.67 ml (3.2 mmol) of diethylenetriamine, and 603 ml of toluene (dried with molecular sieves and bubbled with nitrogen) were added to the reaction solution. Similarly, the conversion rate of MMA was determined. At a BA conversion rate of 97%, an EA conversion rate of 96%, an MEA conversion rate of 90%, and an MMA conversion rate of 51%, 300 ml of toluene was added to the reaction solution, and the reactor was cooled in a water bath to terminate the reaction.

The reaction solution was filtered with activated alumina to remove a copper complex. Then, the filtrate was added to a large amount of methanol to precipitate a polymer, and the resultant polymer was dried under vacuum at 60° C. for 24 hours to produce the target block copolymer (A-2).

PRODUCTION EXAMPLE 3

Synthesis of MMA-b-(BA-co-EA-co-MEA)-b-MMA Block Copolymer (MMA/(BA, EA, MEA)=3/7)

After the air in a 500 ml separable flask used as a polymerization reactor was replaced with nitrogen, 1.37 g (9.5 mmol) of copper bromide and 20 ml of acetonitrile (dried with molecular sieves and bubbled with nitrogen) were added to the flask. The resultant mixture was stirred under heating at 70° C. for 5 minutes and then cooled to room temperature. Then, 0.69 g (1.9 mmol) of diethyl 2,5-dibromoadipate as the initiator, 40.2 ml (280 mmol) of BA, 38.2 ml (352 mmol) of EA, and 21.6 ml (168 mmol) of MEA were added to the mixture. After stirring under heating at 80° C., 0.20 ml (1.0 mmol) of diethylenetriamine as a ligand was as added to the resultant mixture to initiate polymerization.

After polymerization was initiated, about 0.2 ml of a solution was sampled from the polymerization solution at predetermined time intervals, and each sampled solution was subjected to gas chromatographic analysis to determine the conversion rate of each of BA, EA, and MEA. The polymerization rate was controlled by adding the triamine as occasion demands. At a BA conversion rate of 94%, an EA conversion rate of 93%, and an MEA conversion rate of 95%, 42.8 ml (400 mmol) of MMA, 1.82 g (18.5 mmol) of copper chloride, 0.20 ml (1.0 mmol) of diethylenetriamine, and 128.5 ml of toluene (dried with molecular sieves and bubbled with nitrogen) were added to the reaction solution. Similarly, the conversion rate of MMA was determined. At a BA conversion rate of 97%, an EA conversion rate of 97%, an MEA conversion rate of 98%, and an MMA conversion rate of 82%, 150 ml of toluene was added to the reaction solution, and the reactor was cooled in a water bath to terminate the reaction.

The reaction solution was filtered with activated alumina to remove a copper complex. Then, the filtrate was added to a large amount of methanol to precipitate a polymer, and the resultant polymer was dried under vacuum at 60° C. for 24 hours to produce the target block copolymer (A-3).

The GPC analysis of the resultant block copolymer showed a number-average molecular weight Mn of 113,000, and a molecular weight distribution Mw/Mn of 1.49. Also, the NMR analysis of the composition showed EA/BA/MEA/MMA=24/33/15/28 (% by weight).

PRODUCTION EXAMPLE 4

Synthesis and Functional Group Conversion of (MMA-co-TBMA)-b-(BA-co-EA-co-MEA)-b-(MMA-co-TBMA) Block Copolymer (A-4)

In a 5 L separable flask, 6.03 g (16.8 mmol) of diethyl 2,5-dibromoadipate, 362 ml (2.52 mol) of BA, 344 ml (3.17 mol) of EA, and 195 ml (1.51 mol) of MEA were charged and subjected to polymerization. At a BA conversion rate of 95%, an EA conversion rate of 95%, and an MEA conversion rate of 97%, 42.5 ml (0.26 mol) of TBMA and 534 ml (4.99 mol) of MMA were added to the reaction solution. At a TBMA conversion rate of 64% and an MMA conversion rate of 59%, the reaction was terminated. Then, the same operation as in Example 1 except for adjusting the amount of the catalyst was performed to produce the target block copolymer (A-4). The GPC analysis of the resultant block copolymer (A-4) showed a number-average molecular weight Mn of 124,008, and a molecular weight distribution Mw/Mn of 1.45. The functional groups of the block copolymer (A-4) were converted by the same method as in Example 1 to synthesize a carboxyl-containing block copolymer (A-5). The content of a carboxyl-containing monomer in the resultant block copolymer (A-5) was 1.29% by weight.

PRODUCTION EXAMPLE 5

Synthesis and Functional Group Conversion of (MMA-co-TBMA)-b-(BA-co-EA-co-MEA)-b-(MMA-co-TBMA) Block Copolymer (A-6)

In a 5 L separable flask, 4.65 g (12.9 mmol) of diethyl 2,5-dibromoadipate, 201 ml (1.40 mol) of BA, 191 ml (1.76 mol) of EA, and 108 ml (0.84 mol) of MEA were charged and subjected to polymerization. At a BA conversion rate of 95%, an EA conversion rate of 96%, and an MEA conversion rate of 98%, 465 ml (2.87 mol) of TBMA and 307 ml (2.87 mol) of MMA were added to the reaction solution. At a TBMA conversion rate of 62% and an MMA conversion rate of 60%, the reaction was terminated. Then, the same operation as in Example 1 except for adjusting the amount of the catalyst was performed to produce the target block copolymer (A-6). The GPC analysis of the resultant block copolymer (A-6) showed a number-average molecular weight Mn of 107,168, and a molecular weight distribution Mw/Mn of 1.31. The functional groups of the block copolymer (A-6) were converted by the same method as in Example 1 to synthesize a carboxyl-containing block copolymer (A-7). The content of a carboxyl-containing monomer in the resultant block copolymer (A-7) was 19.7% by weight.

PRODUCTION EXAMPLE 6

Synthesis of (MMA-co-HEMA)-b-BA-b-(MMA-co-HEMA) Block Copolymer (A-8)

The operation below was performed for producing a block copolymer including a (meth)acrylic polymer block having hydroxyl groups. In a 500 ml separable flask, 0.57 g (1.57 mmol) of diethyl 2,5-dibromoadipate as an initiator and 90 ml (628 mmol) of BA were charged to initiate polymerization. At a BA conversion rate of 95%, 35.3 ml (330 mmol) of MMA and 1.9 ml (15.7 mol) of HEMA were added to the reaction solution. At an MMA conversion rate of 83% and a BA conversion rate of 97%, the reaction was terminated. Then, the same operation as that for producing the block copolymer (a) in Example 1 except for adjusting the amount of the catalyst was performed to produce the target block copolymer (A-8).

The GPC analysis of the resultant block copolymer (A-8) showed a number-average molecular weight Mn of 94,000, and a molecular weight distribution Mw/Mn of 1.75.

PRODUCTION EXAMPLE 7

Synthesis of MMA-(BA-co-HEA)-MMA Block Copolymer (A-9)

After the air in a 5 L separable flask used as a polymerization reactor was replaced with nitrogen, 11.6 g (80.7 mmol) of copper bromide, 180 ml of acetonitrile (bubbled with nitrogen), 5.8 g (16.1 mmol) of diethyl 2,5-dibromadipate functioning as an initiator, 832 ml (5.8 mol) of BA, and 67.5 ml (0.65 mol) of HEA were added according to the same procedure as in Example 1. Then, 1.68 ml (8.1 mmol) of diethylenetriamine as a ligand was added to initiate polymerization.

At a BA conversion rate of 94%, 559 ml (5.22 mol) of MMA, 7.89 g (0.081 mol) of copper chloride, 1.68 ml (8.1 mmol) of diethylenetriamine, and 1,110 ml of toluene (bubbled with nitrogen) were added to the reaction solution. At an MMA conversion rate of 63% and a BA conversion rate of 97%, 1,600 ml of toluene was added to the reaction solution, and the reactor was cooled in a water bath to terminate the reaction. Then, the same operation as that for producing the block copolymer (a) in Example 1 was performed to produce the target block copolymer (A-9).

The GPC analysis of the resultant block copolymer showed a number-average molecular weight Mn of 118,355, and a molecular weight distribution Mw/Mn of 1.69. Also $^1$H-NMR analysis of the composition showed BA/HEA/MMA=63/7/30 (% by weight).

In the examples and comparative examples below, measurement and evaluation were performed by the methods and under conditions described below. In the examples and comparative examples, the polymers produced in Examples 3, 4, and 6 and Production Examples 1 to 7 were used. The molded product of each of the polymers was measured for hardness, tensile break strength, tensile break elongation, oil resistance, adhesion, and wax remover resistance.

(Hardness)

Hardness at 23° C. (initial value according to JIS A) was measured according to JIS K6253. However, when a hardness measured by a type A durometer exceeded 90, the hardness was measured by a type D durometer (JIS D).

(Tensile Break Strength (MPa) and Tensile Break Elongation (%))

The tensile break strength and tensile break elongation were measured with Autograph model AG-10TB produced by SHIMADZU Corporation according to the method described in JIS K7113. Measurement was conducted with n=3, and averages of strength (MPa) and elongation (%) at breakage of a test piece were determined. The test piece had a shape of No. 2(1/3) having a thickness of about 2 mm. Also, measurement was conducted at 23° C. and at a test rate of 500 mm/min. Before the measurement, as a rule, the test piece was conditioned at a temperature of 23±2° C. and a relative humidity of 50±5% for 48 hours or more.

(Oil Resistance)

A molded product of a composition was immersed in oil (ASTM oil No. 3) kept at 150° C. for 72 hours according to ASTM D638 to determine a rate of change in weight.

The oil resistance was evaluated on the basis of the following criteria:
A: The rate of change in weight was less than 10%
B: The rate of change in weight was 10% or more and less than 30%.
C: The rate of change in weight was 30% or more.

The shape was observed before and after immersion and evaluated on the basis of the following criteria:
A: The shape was maintained.
B: The shape was changed.

Also, overall evaluation was performed on the basis of the following criteria:
A: Both the change in weight and shape were evaluated as good.
B: One of the change in weight and the shape was evaluated as poor.

(Heat Resistance)

The heat resistance was evaluated on the basis of a flow beginning temperature by flow measurement. Measurement was performed with a flow tester CFT-500 produced by SHIMADZU Corporation. In the measurement, a resin sample was extruded from a nozzle having an inner diameter of 1 mm and a length of 10 mm under heating at a heating rate of 5° C./min with a load of 60 Kgf/cm$^2$, and the temperature (indicated by Tfb in this tester) at which the resin extrusion piston of the flow tester apparently started falling was measured as the flow beginning temperature.

(Adhesion)

Each of the various adhesives (S-1: Trade name "Cemedine Zerotype" produced by Cemedine Co., Ltd., an instant adhesive mainly composed of cyanoacrylate; S-2: Trade name "Bond G17" produced by Konishi Co., Ltd., a general purpose adhesive for synthetic rubber, metals, leather, and wood mainly composed of chloroprene rubber; S-3: Trade name "Bond SaiRex Clear" produced by Konishi Co., Ltd., a multi-purpose highly adhesive, transparent, and reactive adhesive mainly composed of modified silicone polymer; S-4: Bond for wood produced by Konishi Co., Ltd., an aqueous adhesive for wood mainly composed of vinyl acetate resin; and S-5: Bond for vinyl resin produced by Konishi Co., Ltd., a vinyl chloride resin-based solvent adhesive mainly composed of vinyl chloride) was coated on a stainless metal plate. Then, an end of a sample was pressure-bonded to the plate and allowed to stand for 10 hours. Then, the sample was manually peeled off from the unbonded end. When the sample was separated at the interface with the metal plate, the adhesion was evaluated as good (A). When the sample was separated at the interface with the resin, the adhesion was evaluated as poor (B).

(Wax Remover Resistance)

A molded product of a composition was immersed in a solution of Wax remover ST7 (produced by Yushiro Chemical Industry Co., Ltd.) kept at 120° C. for 48 hours to measure a rate of change in weight and a rate of change in volume.

EXAMPLES 8 TO 10

The block copolymer produced in each of Production Examples 1 to 3 and Irganox 1010 (produced by Ciba Geigy Corporation) were mixed at the ratio shown in Table 2 and melt-kneaded at 200° C. with Laboplastomill (produced by Toyo Seiki Company, Japan) set to 200° C. at a screw rotational speed of 100 rpm for about 5 minutes to produce a block sample. The resulting sample was heat-pressed at a temperature of 230° C. to form a molded product of 2 mm in thickness for evaluating the physical properties and a cylindrical molded product of 30 mm in diameter and 12 mm in thickness for evaluating compression set. These molded products were subjected to measurement of hardness, tensile break strength, tensile break elongation, oil resistance, adhesion, and wax remover resistance.

COMPARATIVE EXAMPLE 3

Septon 2043 (produced by Kuraray Co., Ltd.), which was a typical example of low-hardness styrene thermoplastic elastomers, and Irganox 1010 (produced by Ciba Geigy Corporation) were mixed at the ratio shown in Table 2 and melt-kneaded at 160° C. with Laboplastomill (produced by Toyo Seiki Company, Japan) for about 5 minutes to produce a block sample. The resulting sample was heat-pressed at a temperature of 160° C. to form a molded product of 2 mm in thickness for evaluating the physical properties and a cylindrical molded product of 30 mm in diameter and 12 mm in thickness for evaluating compression set.

These molded products were subjected to measurement of hardness, tensile break strength, tensile break elongation, oil resistance, and adhesion. The results are shown in Table 2.

COMPARATIVE EXAMPLE 4

Santoprene 211-55 (produced by ADVANCED ELASTOMER SYSTEMS, L.P.), which was a typical example of low-hardness olefin thermoplastic elastomers which is vulcanized dynamically, and Irganox 1010 (produced by Ciba Geigy Corporation) were mixed at the ratio shown in Table 2 and melt-kneaded at 170° C. with Laboplastomill (produced by Toyo Seiki Company, Japan) for about 5 minutes to produce a block sample. The resulting sample was heat-pressed at a temperature of 170° C. to form a molded product of 2 mm in thickness for evaluating the physical properties and a cylindrical molded product of 30 mm in diameter and 12 mm in thickness for evaluating compression set.

These molded products were subjected to measurement of hardness, tensile break strength, tensile break elongation, oil resistance, and wax remover resistance. The results are shown in Table 2.

shape after being released from the mold without adhesion to the mold. The molded product was subjected to measurement of tensile break strength, hardness, heat resistance, and oil resistance. The results are shown in Table 3.

TABLE 2

| | Resin composition | Example 8 | Example 9 | Example 10 | Comp. Example 3 | Comp. Example 4 |
|---|---|---|---|---|---|---|
| Component | A-1 | 100 | — | — | — | — |
| | A-2 | — | — | 100 | — | — |
| | A-3 | — | 100 | — | — | — |
| | Septon 2043 | — | — | — | 100 | — |
| | Santoprene 211-55 | — | — | — | — | 100 |
| | Irganox1010 | 0.5 | 0.5 | 0.5 | 0.5 | 0.5 |
| Physical properties | Hardness (Initial value) JIS-A | 42 | 31 | 61* | 36 | 55 |
| | Tensile break strength MPa | 8.6 | 6.2 | 24.8 | 12 | 4.6 |
| | Tensile break elongation % | 339 | 632 | 33 | 1110 | 375 |
| | Oil resistance % | 80.3 | 24.3 | 16.0 | Dissolved | 189.5 |
| | Adhesion | | | | | |
| | S-1 | A | A | A | A | |
| | S-2 | A | A | A | B | |
| | S-3 | A | A | A | B | |
| | S-4 | A | A | A | B | |
| | S-5 | A | A | A | B | |
| | Wax remover resistance | | | | | |
| | Rate of change in volume % | | 77 | | | 267 |
| | Rate of change in weight % | | 21 | | | 147 |

Table 2 indicates that the block copolymers of Examples 8 and 9 each comprising the (meth)acrylic polymer block (a) and the acrylic polymer block (b) at a ratio of 3/7 have low hardness and excellent adhesion. The block polymer of Example 9 further has excellent oil resistance and wax remover resistance. Table 2 also indicates that the block copolymer of Example 10 comprising the (meth)acrylic polymer block (a) and the acrylic polymer block (b) at a ratio of 6/4 has excellent oil resistance and adhesion, but tends to exhibit low tensile break elongation and high hardness.

EXAMPLE 11

One hundred parts by weight of the block copolymer produced in Production Example 3 and 0.5 part by weight of Irganox 1010 as a stabilizer were mixed and melt-kneaded with Laboplastomill (produced by Toyo Seiki Company, Japan) set to 190° C. The resulting sample was heat-pressed at a temperature of 190° C. to form a cylindrical molded product of 30 mm in diameter and 12 mm in thickness. The molded product had a satisfactory shape after being released from the mold without adhesion to the mold. The molded product was subjected to measurement of tensile break strength, hardness, heat resistance, and oil resistance. The results are shown in Table 3.

EXAMPLE 12

A cylindrical molded product of 30 mm in diameter and 12 mm in thickness was formed by the same method as in Example 11 except that the block copolymer (f) produced in Example 3 was used. The molded product had a satisfactory shape after being released from the mold without adhesion to the mold. The molded product was subjected to measurement of tensile break strength, hardness, heat resistance, and oil resistance. The results are shown in Table 3.

EXAMPLE 13

A cylindrical molded product of 30 mm in diameter and 12 mm in thickness was formed by the same method as in Example 11 except that the block copolymer (h) produced in Example 4 was used. The molded product had a satisfactory shape after being released from the mold without adhesion to the mold. The molded product was subjected to measurement of tensile break strength, hardness, heat resistance, and oil resistance. The results are shown in Table 3.

EXAMPLE 14

A cylindrical molded product of 30 mm in diameter and 12 mm in thickness was formed by the same method as in Example 11 except that the block copolymer (l) produced in Example 6 was used. The molded product had a satisfactory shape after being released from the mold without adhesion to the mold. The molded product was subjected to measurement of tensile break strength, hardness, heat resistance, and oil resistance. The results are shown in Table 3.

EXAMPLE 15

A cylindrical molded product of 30 mm in diameter and 12 mm in thickness was formed by the same method as in Example 11 except that the block copolymer (A-5) produced in Production Example 4 was used. The molded product had a satisfactory shape after being released from the mold without adhesion to the mold. The molded product was subjected to measurement of tensile break strength, hardness, heat resistance, and oil resistance. The results are shown in Table 3.

EXAMPLE 16

A cylindrical molded product of 30 mm in diameter and 12 mm in thickness was formed by the same method as in Example 11 except that the block copolymer (A-7) produced in Production Example 5 was used. The molded product had a satisfactory shape after being released from the mold without adhesion to the mold. The molded product was subjected to measurement of tensile break strength, hardness, heat resistance, and oil resistance. The results are shown in Table 3.

EXAMPLE 17

Twenty parts by weight of polyamide PA (UBE Nylon 1013B produced by Ube Industries, Ltd.) and 0.5 parts by weight of Irganox 1010 (produced by Ciba Geigy Corporation) were added to 100 parts by weight of the block copolymer produced in Production Example 3, and the resultant mixture was melt-kneaded with Laboplastomill (produced by Toyo Seiki Company, Japan) set to 230° C. The resulting sample was heat-pressed at a temperature of 230° C. to form a cylindrical molded product of 30 mm in diameter and 12 mm in thickness. The molded product had a satisfactory shape after being released from the mold without adhesion to the mold. The molded product was subjected to measurement of tensile break strength, hardness, heat resistance, and oil resistance. The results are shown in Table 3.

COMPARATIVE EXAMPLE 5

0.5 part by weight of Irganox 1010 functioning as a stabilizer was added to 100 parts by weight of Pelprene P 30B (produced by Toyobo Co., Ltd.), which was an example of polyester thermoplastic elastomers, and the resultant mixture was melt-kneaded with Laboplastomill (produced by Toyo Seiki Company, Japan) set to 190° C. to form a block sample. The resulting sample was heat-pressed at a temperature of 190° C. to form a cylindrical molded product of 30 mm in diameter and 12 mm in thickness for evaluating compression set. The molded product was subjected to measurement of tensile break strength, hardness, heat resistance, and oil resistance. The results are shown in Table 3.

TABLE 3

| Mixing amount (part by weight) | | Example 11 | 12 | 13 | 14 | 15 | 16 | 17 | Comp. Example 5 |
|---|---|---|---|---|---|---|---|---|---|
| Component | A-3 | 100 | | | | | | 100 | |
| | f | — | 100 | | | | | — | |
| | h | | | 100 | | | | | |
| | l | | | | 100 | | | | |
| | A-5 | | | | | 100 | | | |
| | A-7 | | | | | | 100 | | |
| | Thermoplastic resin: PA6 | | | | | | | 20 | |
| | Pelprene | | | | | | | — | 100 |
| Physical properties | Hardness (JIS-A) | 31 | 25 | 23 | 30 | 31 | 86 | 61 | 79 |
| | Breaking strength (MPa) | 6.2 | 9.2 | 7.5 | 8 | 7.9 | 16 | 7.1 | 25.4 |
| | Breaking elongation (%) | 632 | 570 | 392 | 622 | 663 | 148 | 168 | 1426 |
| | Flow beginning temperature (° C.) | 111 | 163 | 167 | 112 | 104 | 193 | 118 | 145 |
| | Oil resistance (rate of change) | B | B | B | B | B | B | B | C |
| | Rate of change in weight (%) | 24.3 | 29.4 | 24.6 | 19.9 | 22.6 | 19.3 | 18.6 | 64.2 |

Examples 11 to 16 indicate that the acrylic block polymer produced in the present invention has excellent flexibility and oil resistance. However, a polyester thermoplastic elastomer (Comparative Example 5) which is generally regarded to be excellent in oil resistance has high hardness and poor oil resistance. Example 17 indicates that a material containing a thermoplastic resin has high hardness while maintaining the oil resistance and mechanical properties. It is also found that the flow beginning temperature of an acrylic block copolymer measured by the flow tester is increased by introducing a carboxyl group, thereby producing a material having superior heat resistance.

EXAMPLE 18

The block copolymer produced in Production Example 1, polyamide PA (UBE Nylon 1013B produced by Ube Industries, Ltd.), and Irganox 1010 (produced by Ciba Geigy Corporation) were mixed at the ratio shown in Table 4 and melt-kneaded with Laboplastomill (produced by Toyo Seiki Company, Japan) set to 230° C. A crosslinking agent, triethylene glycol (produced by Wako Pure Chemical Industries, Ltd.) was further added at the ratio shown in Table 4, and the resulting mixture was melt-kneaded. Then, a titanium (IV) tetrabutoxide monomer (produced by Wako Pure Chemical Industries, Ltd.) was added to the mixture under melt kneading at 230° C. and a screw rotational speed of 100 rpm to promote reaction (dynamic crosslinking). Then, PEP-36 (produced by Asahi Denka Kogyo K.K.) was added to produce a sample. The resulting sample was heat-pressed at a temperature of 230° C. to form a cylindrical molded product of 30 mm in diameter and 12 mm in thickness. The molded product was subjected to measurement of hardness and compression set. Similarly, the sample was heat-pressed at a temperature of 230° C. to form a molded sheet product of 2 mm in thickness. The molded products were subjected to measurement of oil resistance and insoluble content.

EXAMPLE 19

The same process as in Example 18 was performed until PEP-36 was added. After PEP-36 was added, a plasticizer UL-100 (produced by Asahi Denka Kogyo K.K.) was added to the resultant mixture under melt kneading to form a sample. Then, the sample was evaluated by the same method as in Example 18.

EXAMPLE 20

The block copolymer A-8 produced in Production Example 6, polyamide PA (UBE Nylon 1013B produced by Ube Industries, Ltd.), and Irganox 1010 (produced by Ciba Geigy Corporation) were mixed at the ratio shown in Table 4 and melt-kneaded with Laboplastomill (produced by Toyo Seiki Company, Japan) set to 230° C. Furthermore, a titanium (IV) tetrabutoxide monomer (produced by Wako Pure Chemical Industries, Ltd.) was added to the resultant mixture under melt kneading at 230° C. and a screw rotational speed of 100 rpm to promote reaction (dynamic crosslinking). Then, PEP-36 (produced by Asahi Denka Kogyo K.K.) was added to the mixture, and a sample was produced when the torque of the plastomill became constant to create a stable state. The resulting sample was heat-pressed at a temperature of 230° C. to form a cylindrical molded product of 30 mm in diameter and 12 mm in thickness. The molded product was subjected to measurement of hardness and compression set. Similarly, the sample was heat-pressed at a temperature of 230° C. to form a molded sheet product of 2 mm in thickness. The molded product was subjected to measurement of oil resistance and insoluble content.

EXAMPLE 21

The block copolymer A-9 produced in Production Example 7, 30 parts of polyamide PA (UBESTA 3012U(R) produced by Ube Industries, Ltd.), and Irganox 1010 (produced by Ciba Geigy Corporation) were mixed at the ratio shown in Table 4 and melt-kneaded with Laboplastomill (produced by Toyo Seiki Company, Japan) set to 230° C. Furthermore, a titanium (IV) tetrabutoxide monomer (produced by Wako Pure Chemical Industries, Ltd.) was added to the resultant mixture under melt kneading at 230° C. and a screw rotational speed of 100 rpm to promote reaction (dynamic crosslinking). Then, PEP-36 (produced by Asahi Denka Kogyo K.K.) was added to the mixture, and the temperature of the plastomill was changed to 190° C. when the torque of the plastomill became constant to create a stable state. Then, a plasticizer, N-400 (produced by New Japan Chemical Co., Ltd.) was added under melt kneading to produce a sample. The resulting sample was heat-pressed at a temperature of 230° C. to form a cylindrical molded product of 30 mm in diameter and 12 mm in thickness. The molded product was subjected to measurement of hardness and compression set. Similarly, the sample was heat-pressed at a temperature of 230° C. to form a molded sheet product of 2 mm in thickness. The molded product was subjected to measurement of oil resistance and insoluble content.

EXAMPLE 22

The block copolymer A-9 produced in Production Example 7, 30 parts of polyamide PA (UBESTA 3012U(R) produced by Ube Industries, Ltd.), and Irganox 1010 (produced by Ciba Geigy Corporation) were mixed at the ratio shown in Table 4 and melt-kneaded with Laboplastomill (produced by Toyo Seiki Company, Japan) set to 230° C. Furthermore, a titanium (IV) tetrabutoxide monomer (produced by Wako Pure Chemical Industries, Ltd.) was added to the resultant mixture under melt kneading at 230° C. and a screw rotational speed of 100 rpm to promote reaction (dynamic crosslinking). Then, the block copolymer (j) produced in Example 5 was added to the reaction mixture when the torque of the plastomill became constant to create a stable state. Furthermore, PEP-36 (produced by Asahi Denka Kogyo K.K.) was added to the mixture when the torque of the plastomill became constant. Then, the temperature of the plastomill was changed to 190° C., and a plasticizer, N-400 (produced by New Japan Chemical Co., Ltd.) was added under melt kneading to produce a sample. The resulting sample was heat-pressed at a temperature of 230° C. to form a cylindrical molded product of 30 mm in diameter and 12 mm in thickness. The molded product was subjected to measurement of hardness and compression set. Similarly, the sample was heat-pressed at a temperature of 230° C. to form a molded sheet product of 2 mm in thickness. The molded product was subjected to measurement of oil resistance and insoluble content.

EXAMPLE 23

A sample was produced by the same method as in Example 22 except that the plasticizer, N-400 (produced by New Japan Chemical Co., Ltd.), was changed to a mixture of plasticizers N-400 and RS735 (produced by Asahi Denka Kogyo K.K.).

COMPARATIVE EXAMPLE 6

One hundred parts of Santoprene 211-45 (produced by ADVANCED ELASTOMER SYSTEMS, L.P.), which was a polyolefin thermoplastic elastomer comprising a dynamically crosslinked composition of monoolefin copolymer rubber and polyolefin resin, and 0.5 part by weight of Irganox 1010 were mixed. Then, the resultant mixture was melt-kneaded with Laboplastomill (produced by Toyo Seiki Company, Japan) set to 190° C. to produce a block sample. The resulting sample was heat-pressed at a temperature of 190° C. to form a cylindrical molded product of 30 mm in diameter and 12 mm in thickness for evaluating compression set. The molded product was subjected to measurement of tensile break strength, hardness, heat resistance, oil resistance, and compression set. The results are shown in Table 4.

The compression set of Santoprene is a catalog value (after 22 hours at 100° C.).

COMPARATIVE EXAMPLE 7

A cylindrical molded product of 30 mm in diameter and 12 mm in thickness was produced by the same method as in Comparative Example 6 except that 100 parts by weight of GEOLAST701-70 (produced by ADVANCED ELASTOMER SYSTEMS, L.P), which was a polyolefin thermoplastic elastomer comprising a dynamically crosslinked composition of nitrile rubber and polyolefin resin. The molded product was subjected to measurement of tensile break strength, hardness, heat resistance, oil resistance, and compression set. The results are shown in Table 4.

TABLE 4

|  | Mixing amount (parts by weight) | Example 18 | Example 19 | Example 20 | Example 21 | Example 22 | Example 23 | Comp. Example 6 | Comp. Example 7 |
|---|---|---|---|---|---|---|---|---|---|
| Component | A-1 | 100 | 100 | | | | | | |
|  | A-8 | | | 100 | | | | | |
|  | A-9 | | | | 100 | 100 | 100 | | |
|  | j | | | | | 4 | 4 | | |
|  | Thermoplastic resin: PA6 | 20 | 20 | 20 | | | | | |
|  | Thermoplastic resin: PA12 | | | | 30 | 30 | 30 | | |
|  | Crosslinking agent: triethylene glycol | 18.9 | 18.9 | | | | | | |
|  | Plasticizer: UL100 | | 55.7 | | | | | | |
|  | Plasticizer: N-400 | | | | 50 | 50 | 33.2 | | |
|  | Plasticizer: RS735 | | | | | | 16.8 | | |
|  | Ester exchange catalyst: titanium tetrabutoxide | 0.0003 | 0.0003 | 0.0003 | 0.0012 | 0.0004 | 0.0004 | | |
|  | Phosphorus compound: PEP36 | 1.23 | 1.23 | 1.23 | 1.84 | 1.84 | 1.84 | | |
|  | Stabilizer: Irganox 1010 | 0.2 | 0.2 | 0.2 | 0.2 | 0.2 | 0.2 | 0.5 | 0.5 |
|  | Santoprene | | | | | | | 100 | |
|  | GEOLAST | | | | | | | | 100 |
| Physical properties | Hardness (JIS-A) | 88 | 35 | 50 | 81 | 87 | 88 | 53 | 71 |
|  | Breaking strength (MPa) | 8.3 | 3 | 4.5 | 7.3 | 9.2 | 8.3 | 5 | 5 |
|  | Compression set (%) | 35.7 | 29.8 | 38.3 | 35.7 | 21.3 | 19.7 | 23 (100° C.) | 32 |
|  | Insoluble content(%) | 98.3 | 71.9 | 75.3 | 71 | 74.2 | 74.8 | — | — |
|  | Oil resistance Rate of change | B | A | B | A | A | A | C | B |
|  | Oil resistance Shape evaluation | A | A | A | A | A | A | B | B |
|  | Overall evaluation | A | A | A | A | A | A | B | B |

In Table 4, the insoluble content (wt %) of each example was determined by a method comprising immersing 1 g (Wu) of the sample covered with a 100-mesh wire gauze in toluene at 80° C. for 24 hours, fractionating a toluene-soluble content, drying the solid residue at 60° C. under vacuum, and measuring the weight g (Wc) of the solid residue after drying to determine the solid content from the ratio of the weight of the solid residue (Wc) to 1 g (Wu) of the sample. The progress of crosslinking reaction of (meth)acrylic polymer (A) can be confirmed by the insoluble content (wt %).

The insoluble content of the resin A-I was 0%. This result and the insoluble contents of Examples 18 to 23 indicate that the crosslinking reaction of the block copolymer proceeds.

Examples 18 to 23 and Comparative Examples 6 and 7 show that the dynamic crosslinking can produce a thermoplastic elastomer having excellent mechanical properties and compression set and exhibiting superior oil resistance than that of a polyolefin thermoplastic elastomer.

Examples 22 and 23 show that the addition of a small amount of a carboxyl-containing block polymer functioning as a compatibility improver improves the compression set while maintaining the mechanical properties and oil resistance.

INDUSTRIAL APPLICABILITY

The first block copolymer (A) of the present invention can be desirably used as a material which has excellent thermal decomposition resistance while maintaining the inherent properties of an acrylic block copolymer.

The second block copolymer (A) of the present invention can significantly improve compression set at high temperatures while maintaining the inherent properties of an acrylic block copolymer.

Therefore, the block copolymer (A) can be desirably used for hoses, sheets, films, contour-extrusion molded products, various injection-molded products useful in the fields of packaging materials, construction and civil engineering materials, materials for automobile, materials for household electric appliances, and materials for other miscellaneous goods.

A thermoplastic elastomer composition (soft material for automobile) composed of the block copolymer (A) of the present invention exhibits low hardness, high adhesion, high oil resistance, high tensile properties and high wax remover resistance, and thus is suitable for use as a soft material for automobile, particularly an exterior member for automobile.

The block copolymer (A) of the present invention is a material having high heat resistance, high oil resistance, high flexibility, and excellent processability, and can provide automobile hollow molded products. Namely, the soft material for automobile of the present invention can provide hollow molded products for automobile having high heat resistance, high oil resistance, excellent flexibility, and excellent formability.

The invention claimed is:

1. A composition comprising a block copolymer (A) and a thermoplastic resin comprising a polyester resin and/or a polyamide resin, the block copolymer (A) comprising a (meth)acrylic polymer block(a) and an acrylic polymer block (b), the block copolymer (A) being treated by dynamic vulcanization.

2. The composition according to claim 1, wherein a thermoplastic resin is a polyamide resin.

3. The composition according to claim 1, wherein the block copolymer (A) is a tri-block or di-block copolymer.

4. The composition according to claim 1, wherein the block copolymer (A) is (a)-(b)-(a) tri-block copolymer.

5. The composition according to claim 1, wherein the ratio (Mw/Mn) of the weight-average molecular weight (Mw) to the number-average molecular weight (Mn) of the block copolymer (A) measured by gel permeation chromatography is 1.8 or less.

6. The composition according to claim 1, wherein the block copolymer (A) comprises 5 to 90% by weight of the (meth)acrylic polymer block (a) and 95 to 10% by weight of the acrylic polymer block (b).

7. The composition according to claim 1, wherein the block copolymer (A) comprises 10 to 40% weight of the (meth)acrylic polymer block(a) and 90 to 60% by weight of the acrylic polymer block (b).

8. The composition according to claim 1, wherein the block copolymer (A) is produced by atom transfer radical polymerization.

9. The composition according to claim 1, wherein the (meth)acrylic polymer block (a) comprises methyl methacrylate and/or methacrylic acid, and the acrylic polymer block (b) comprises n-butyl acrylate or a mixture of n-butyl acrylate, ethyl acrylate, and 2-methoxyethyl acrylate.

10. The composition according to claim 1, wherein the (meth)acrylic polymer block (a) comprises 50 to 100% by weight of methyl methacrylate and/or methacrylic acid and 0 to 50% by weight of vinyl monomer copolymerizable therewith, and the acrylic polymer block (b) comprises 50 to 100% by weight of n-butyl acrylate or a mixture of n-butyl acrylate, ethyl acrylate, and 2-methoxyethyl acrylate and 0 to 50% by weight of a vinyl monomer copolymerizable therewith.

11. The composition according to claim 1, wherein the block copolymer (A) has at least one hydroxyl group.

12. The composition according to claim 1, wherein the block copolymer (A) has at least one carboxyl group.

13. The Composition according to claim 1, wherein a dynamic vulcanization is ester exchange reaction.

14. An automobile interior member comprising a soft material for automobile according to claim 13.

15. An automobile exterior member comprising a soft material for automobile according to claim 13.

16. An inner layer material comprising a soft material for automobile according to claim 13.

17. A molding material for automobile comprising a soft material for automobile according to claim 13.

18. An automobile hollow-molded product comprising a soft material for automobile according to claim 13.

19. An automobile hollow-molded boot or hose comprising a soft material for automobile according to claim 13.

20. The composition according to claim 1, wherein the number-average molecular weight of block copolymer (A) is 30,000 to 500,000.

21. A soft material for automobile comprising a block copolymer (A) according to claim 1.

* * * * *